United States Patent
Venable et al.

(10) Patent No.: US 10,019,803 B2
(45) Date of Patent: Jul. 10, 2018

(54) STORE SHELF IMAGING SYSTEM AND METHOD USING A VERTICAL LIDAR

(71) Applicant: Conduent Business Services, LLC, Dallas, TX (US)

(72) Inventors: Dennis L. Venable, Marion, NY (US); Wencheng Wu, Webster, NY (US); Charles D. Rizzolo, Fairport, NY (US); Thomas F. Wade, Rochester, NY (US); Ethan Shen, Toronto (CA); Graham Pennington, Webster, NY (US); Lee Anne Williams, Pittsford, NY (US); Daniel S. Hann, Williamson, NY (US)

(73) Assignee: Conduent Business Services, LLC, Dallas, TX (US)

( * ) Notice: Subject to any disclaimer, the term of this patent is extended or adjusted under 35 U.S.C. 154(b) by 93 days.

(21) Appl. No.: 15/295,634

(22) Filed: Oct. 17, 2016

(65) Prior Publication Data

US 2018/0108134 A1    Apr. 19, 2018

(51) Int. Cl.
| | |
|---|---|
| *G06K 9/00* | (2006.01) |
| *G06T 7/00* | (2017.01) |
| *G06K 9/20* | (2006.01) |
| *G06K 9/26* | (2006.01) |

(52) U.S. Cl.
CPC ........ *G06T 7/0057* (2013.01); *G06K 9/00671* (2013.01); *G06K 9/209* (2013.01); *G06K 9/26* (2013.01); *G06T 2207/10028* (2013.01); *G06T 2207/20036* (2013.01); *Y10S 901/01* (2013.01); *Y10S 901/47* (2013.01)

(58) Field of Classification Search
CPC ...... G06Q 10/00; G06Q 10/087; A47F 10/00; G06K 9/209; G06K 9/00671; G06K 9/26; G06T 7/0057; G06T 2207/10028; G06T 2207/20036; Y10S 901/47; Y10S 901/01
See application file for complete search history.

(56) References Cited

U.S. PATENT DOCUMENTS

| | | | |
|---|---|---|---|
| 5,512,739 | A  | 4/1996  | Chandler et al. |
| 6,473,122 | B1 | 10/2002 | Kanekal |
| 6,814,290 | B2 | 11/2004 | Longacre |
| 7,066,291 | B2 | 6/2006  | Martins et al. |
| 7,290,707 | B2 | 11/2007 | Sawasaki |
| 7,386,163 | B2 | 6/2008  | Sabe et al. |
| 7,574,378 | B2 | 8/2009  | Lipowitz et al. |
| 7,693,757 | B2 | 4/2010  | Zimmerman |
| 8,189,855 | B2 | 5/2012  | Opalach et al. |

(Continued)

OTHER PUBLICATIONS

U.S. Appl. No. 15/295,498, filed Oct. 17, 2016, Wu et al.

(Continued)

*Primary Examiner* — Siamak Harandi
(74) *Attorney, Agent, or Firm* — Fay Sharpe LLP

(57) ABSTRACT

This disclosure provides a retail environment robotic system including a vertically oriented/scanning LIDAR (Light Detection and Ranging) unit mounted to a mobile base which travels along the aisles of a retail environment such as a store. According to an exemplary embodiment, the LIDAR unit vertically scans product display units along the aisles to generate a depth map associated with detected objects which is further processed to detect missing products, product/shelving tags, shelves, etc.

21 Claims, 20 Drawing Sheets

(56) References Cited

U.S. PATENT DOCUMENTS

| | | | |
|---|---|---|---|
| 8,296,259 | B1 | 10/2012 | Trandal et al. |
| 8,326,069 | B2 | 12/2012 | Maslov et al. |
| 8,429,004 | B2 | 4/2013 | Hamilton et al. |
| 9,015,072 | B2 | 4/2015 | Wu et al. |
| 2002/0141640 | A1 | 10/2002 | Kraft |
| 2002/0165638 | A1* | 11/2002 | Bancroft .......... A47F 10/00 700/213 |
| 2002/0165790 | A1 | 11/2002 | Bancroft et al. |
| 2002/0196979 | A1 | 12/2002 | Yen et al. |
| 2003/0154141 | A1 | 8/2003 | Capazario et al. |
| 2004/0013295 | A1 | 1/2004 | Sabe et al. |
| 2004/0233278 | A1 | 11/2004 | Prudhomme et al. |
| 2006/0072176 | A1 | 4/2006 | Silverstein et al. |
| 2006/0202032 | A1 | 9/2006 | Kricorissian |
| 2008/0077511 | A1* | 3/2008 | Zimmerman .......... G06Q 10/00 705/28 |
| 2008/0306787 | A1 | 12/2008 | Hamilton et al. |
| 2009/0059270 | A1 | 3/2009 | Opalach et al. |
| 2009/0212113 | A1 | 8/2009 | Chiu et al. |
| 2010/0070365 | A1 | 3/2010 | Siotia et al. |
| 2010/0171826 | A1 | 7/2010 | Hamilton et al. |
| 2013/0030915 | A1 | 1/2013 | Statler et al. |
| 2013/0103608 | A1 | 4/2013 | Scipioni et al. |
| 2013/0193211 | A1 | 8/2013 | Baqai et al. |
| 2013/0229517 | A1 | 9/2013 | Kozitsky et al. |
| 2013/0278761 | A1 | 10/2013 | Wu |
| 2013/0300729 | A1 | 11/2013 | Grimaud |
| 2013/0342706 | A1 | 12/2013 | Hoover et al. |
| 2014/0003727 | A1 | 1/2014 | Lortz et al. |
| 2014/0218553 | A1 | 8/2014 | Deever |
| 2014/0247116 | A1* | 9/2014 | Davidson ............ G06Q 10/087 340/10.1 |
| 2014/0304107 | A1 | 10/2014 | McAllister |
| 2014/0363625 | A1 | 12/2014 | Huang et al. |
| 2015/0046299 | A1 | 2/2015 | Yan |
| 2015/0363758 | A1 | 12/2015 | Wu et al. |
| 2015/0365660 | A1 | 12/2015 | Wu et al. |
| 2015/0365669 | A1 | 12/2015 | Wu et al. |
| 2016/0110633 | A1 | 4/2016 | Moore et al. |

OTHER PUBLICATIONS

U.S. Appl. No. 15/295,306, filed Oct. 17, 2016, Rizzolo et al.
U.S. Appl. No. 15/295,031, filed Oct. 17, 2016, Rizzolo et al.
U.S. Appl. No. 15/294,937, filed Oct. 17, 2016, Venable et al.
U.S. Appl. No. 14/521,996, filed Oct. 23, 2014, Wencheng Wu.
U.S. Appl. No. 14/637,830, filed Mar. 4, 2015, Wu et al.
U.S. Appl. No. 14/643,721, filed Mar. 10, 2015, Wu et al.
U.S. Appl. No. 15/066,392, filed Mar. 10, 2016, Venable et al.
Adelmann et al., "Toolkit for Bar Code Recognition and Resolving on Camera Phones—Jump-Starting the Internet of Things", Informatik Workshop on Mobile and Embedded Interactive Systems, pp. 1-7 (2006).
Bailey, "Super-Resolution of Bar Codes", Journal of Electronic Imaging, vol. 10, No. 1, pp. 213-220 (2001).
Ballard, "Generalizing the Hough Transform to Detect Arbitrary Shapes", Pattern Recognition, vol. 13, No. 2, pp. 111-122 (1981).
Bodnár et al., "Barcode Detection With Uniform Partitioning and Morphological Operations", Conf. of PhD Students in Computer Science, pp. 4-5 (2012).
Bodnár et al., "Improving Barcode Detection With Combination of Simple Detectors", Int'l Conf. on Signal Image Technology and Internet Based Systems, pp. 300-306 (2012).
Canny, "A Computational Approach to Edge Detection", IEEE Transactions on Pattern Analysis and Machine Intelligence, vol. PAMI-8, No. 6, pp. 679-698 (1986).
Ebner et al., "Development and Testing of a Color Space (IPT) With Improved Hue Uniformity", Proceedings of IS&T/SID's Sixth Color Imaging Conf., pp. 8-13 (1998).
Felzenszwalb et al., "Distance Transforms of Sampled Functions", Cornell Computing and Information Science, Tech. Rep., pp. 1-15 (2004).
Gonzalez et al., "Digital Image Processing", $3^{rd}$ Edition, Prentice Hall, pp. 1-22 (2008).
Hodges, "An Introduction to Video and Audio Measurement", Elsevier, p. 173-185 (2004).
Hunt, "The Reproduction of Colour", John Wiley & Sons, p. 48 (2004).
Jain et al., "Bar Code Localization Using Texture Analysis", Proceedings of the Second Int'l Conf. on Document Analysis and Recognition, pp. 41-44 (1993).
Joseph et al., "Bar Code Waveform Recognition Using Peak Locations", IEEE Transactions on Pattern Analysis and Machine Intelligence, vol. 16, No. 6, pp. 630-640 (1994).
Juett, "Barcode Localization Using a Bottom Hat Filter", NSF Research Experience for Undergraduates, pp. 1-26 (2005).
Katona et al., "A Novel Method for Accurate and Efficient Barcode Detection With Morphological Operations", Eighth Int'l Conf. on Signal Image Technology and Internet Based Systems, pp. 307-314 (2012).
Kiryati et al., "A Probabilistic Hough Transform", Pattern Recognition, vol. 24, No. 4, pp. 303-316 (1991).
Kuroki et al., "Bar Code Recognition System Using Image Processing", Hitachi Process Computer Engineering, Inc., pp. 568-572 (1990).
Lin et al., "Multi-Symbology and Multiple 1D/2D Barcodes Extraction Framework", Advances in Multimedia Modeling, pp. 401-410 (2011).
Lin et al., "Real-Time Automatic Recognition of Omnidirectional Multiple Barcodes and DSP Implementation", Machine Vision and Applications, vol. 22, pp. 409-419 (2011).
Liyanage, "Efficient Decoding of Blurred, Pitched, and Scratched Barcode Images", Second Int'l Conf. on Industrial and Information Systems, pp. 1-6 (2007).
McKesson, "Linearity and Gamma—Chapter 12—Dynamic Range", arcsynthesis.org, pp. 1-7 (retrieved Jul. 11, 2013).
Muniz et al., "A Robust Software Barcode Reader Using the Hough Transform", Int'l Conf. on Information Intelligence and Systems, pp. 313-319 (1999).
Normand et al., "A Two-Dimensional Bar Code Reader", $12^{th}$ Int'l Conf. on Pattern Recognition, vol. 3, pp. 201-203 (1994).
Ohbuchi et al., "Barcode Readers Using the Camera Device in Mobile Phones", Proceedings of the 2004 Int'l Conf. on Cyberworlds, pp. 1-6 (2004).
Oktem et al., "A Superesolution Approach for Bar Code Reading", Electrical and Engineering Department, Atilim University, Turkey, pp. 1-4 (2002).
Oktem, "Bar Code Localization in Wavelet Domain by Using Binary", Proceedings of the IEEE $12^{th}$ Signal Processing and Communications Applications Conference, pp. 499-501 (2004).
Pavlidis et al., "Fundamentals of Bar Code Information Theory", IEEE Transactions on Pattern Analysis and Machine Intelligence, vol. 16, No. 6, pp. 630-640 (1994).
Poynton, "Digital Video and HDTV: Algorithms and Interfaces" Morgan Kaufman Publishers, pp. 260 and 630 (2003).
Poynton, "Frequently Questioned Answers About Gamma", poynton.com, pp. 1-3 (2010).
Reinhard et al., "High Dynamic Range Imaging: Acquisition, Display, and Image-Based Lighting", Morgan Kaufmann Publishers, p. 82 (2010).
Tuinstra, "Reading Barcodes From Digital Imagery", Ph.D. dissertation, Cedarville University, pp. 1-18 (2006).
Wittman et al., "Super-Resolution of 1D Barcode Images", University of Minnesota, pp. 1-41 (2004).
Wu et al., "Automatic Thresholding of Gray-Level Using Multi-Stage Approach", Proceedings of the Seventh Int'l Conf. on Document Analysis and Recognition, pp. 493-497 (2003).
Youssef et al., "Automated Barcode Recognition for Smart Identification and Inspection Automation", Expert Systems with Applications, vol. 33, No. 4, pp. 968-977 (2007).
Zhang, "Flexible Camera Calibration by Viewing a Plane From Unknown Orientations", Int'l Conf. on Computer Vision, Corfu, Greece, pp. 666-673 (1999).

(56) References Cited

OTHER PUBLICATIONS

Husky et al., "Unmanned Ground Vehicle, Clearpath Robotics," pp. 1-2 (2013).

* cited by examiner

STORE SHELF IMAGING SYSTEM AND METHOD USING A VERTICAL LIDAR

BACKGROUND

In retail store robotics applications, autonomous robots traverse a store performing one or more missions that involve analysis of the store shelf contents. Such missions may require capturing high resolution images of the shelves for reading barcodes and/or capturing low resolution images to generate aisle images. One such mission is to read barcodes that are present on the shelf edges to determine exactly how products are arranged in the store.

This disclosure and the exemplary embodiments described herein provide a system and method to determine where products are missing from the shelves for restocking purposes. The disclosed system and method use a vertically oriented LIDAR (Light Detection and Ranging) to capture depth information along the aisle and analyze the results to determine 1) where shelves are along an aisle, 2) locations along the shelf where product is missing, and 3) to indicate the locations along the shelf where promotional tags are presented.

INCORPORATION BY REFERENCE

U.S. Pat. No. 8,429,004, issued Apr. 23, 2013, by Hamilton et al., and entitled "METHOD AND SYSTEM FOR AUTOMATICALLY MEASURING RETAIL STORE DISPLAY COMPLIANCE";

U.S. Pat. No. 9,015,072, issued Apr. 21, 2015, by Wu et al. and entitled "METHOD AND APPARATUS FOR AUTOMATED INVENTORY MANAGEMENT USING DEPTH SENSING";

U.S. Patent Publication No. 2014/0304107, published Oct. 9, 2014, by Clark William McAllister, and entitled "WEBROOMING WITH RFID-SCANNING ROBOTS";

U.S. Patent Publication No. 2015/0363625, published Dec. 17, 2015, by Wu et al., and entitled "IMAGE PROCESSING METHODS AND SYSTEMS FOR BARCODE AND/OR PRODUCT LABEL RECOGNITION";

U.S. Patent Publication No. 2015/0363758, Published Dec. 17, 2015, by Wu et al., and entitled "STORE SHELF IMAGING SYSTEM";

U.S. Patent Publication No. 2015/0365660, published Dec. 17, 2015, by Wu et al., and entitled "METHOD AND SYSTEM FOR SPATIAL CHARACTERIZATION OF AN IMAGING SYSTEM";

U.S. Patent Publication No. 2016/0110633, published Apr. 21, 2016, by Moore et al., and entitled "ON-DEMAND SHELF SIGNAGE PRINTING";

U.S. Patent Publication No. 2016/0119540, published Apr. 28, 2016, by Wencheng Wu, and entitled, "MODEL-BASED PLANE-LIKE PANORAMA AND RETAIL APPLICATIONS";

U.S. Patent Publication No. 2016/0260051, published Sep. 8, 2016, by Wu et al., and entitled "SYSTEM AND METHOD FOR RETAIL STORE PROMOTIONAL PRICE TAG DETECTION AND MAINTENANCE VIA HEURISTIC CLASSIFIERS";

U.S. Patent Publication No. 2016/0267304, published Sep. 15, 2016, by Wu et al., and entitled "PRINTED TAG INFORMATION RECOGNITION USING MULTI-POSE ILLUMINATION TO MITIGATE GLARE";

U.S. patent application Ser. No. 15/066,392, filed Mar. 10, 2016, by Venable et al., and entitled "SYSTEMS AND METHODS FOR ROBOT MOTION CONTROL AND IMPROVED POSITIONAL ACCURACY";

U.S. patent application Ser. No. 15/066,507, filed Mar. 10, 2016, by Wu et al., and entitled "HIGH ACCURACY LOCALIZATION SYSTEM AND METHOD FOR RETAIL STORE PROFILING VIA PRODUCT IMAGE RECOGNITION AND ITS CORRESPONDING DIMENSION DATABASE";

U.S. patent application Ser. No. 15/294,937, filed Oct. 17, 2016, by Venable et al., and entitled "STORE SHELF IMAGING SYSTEM AND METHOD";

U.S. patent application Ser. No. 15/295,031, filed Oct. 17, 2016, by Rizzolo et al., and entitled "STORE SHELF IMAGING SYSTEM AND METHOD";

U.S. patent application Ser. No. 15/295,306, filed Oct. 17, 2016, by Rizzolo et al., and entitled "STORE SHELF IMAGING SYSTEM AND METHOD"; and U.S. patent application Ser. No. 15/295,498, filed Oct. 17, 2016, by Wu et al., and entitled "SYSTEM AND METHOD FOR RETAIL STORE PROMOTIONAL PRICE TAG DETECTION", are incorporated herein by reference in their entirety.

BRIEF DESCRIPTION

In one embodiment of this disclosure, described is a retail environment robotic system comprising: a mobile base including an operatively associated navigation component configured to determine a location of the mobile base within a retail environment, the retail environment including a plurality of product display units arranged in a plurality of aisles, each product display unit including a plurality of product display fixtures and a plurality of products arranged on one or more of the product display fixtures; a vertical scanning LIDAR (Light Detection and Ranging) unit operatively mounted to the mobile base, the LIDAR unit configured to scan in a vertical direction and generate a vertical array of distance and angle values representative of a plurality of object distances and angles from the LIDAR unit to a plurality of objects detected along the vertical scan of the LIDAR unit; a LIDAR data processing component operatively associated with the LIDAR unit, the LIDAR data processing component configured to process the plurality of vertical arrays of object distances and angles to generate a depth map associated with one or more product display units as the mobile base travels along an aisle, the depth map including a plurality of columns and a plurality of rows where each of the plurality of columns is associated with a single vertical scan of the LIDAR unit at one of a plurality of locations along the aisle, and each of the plurality of rows is associated with one of a plurality of vertical distances; and a depth map processing component configured to identify regions of the depth map associated with regions of the one or more product display units which include one or more of a missing product, the product, a shelf, a product tag attached to the product, and a shelf tag attached to the shelf.

In another embodiment of this disclosure, described is a retail environment robotic system comprising: a mobile base including an operatively associated navigating component configured to determine a location of the mobile base within a retail environment including a plurality of product display units arranged in a plurality of aisles, each product display unit including a plurality of product display fixtures, a plurality of products arranged on one or more shelves of the product display fixtures, and a plurality of tags attached to the shelves of the product display fixtures, each tag including product-related data including a barcode associated with a respective product proximately located on the product display fixture shelf near the tag; an image capture assembly operatively mounted on the mobile base, the assembly including a plurality of image capture devices for acquiring images of the product display units; a vertical scanning LIDAR (Light Detection and Ranging) unit operatively mounted to one of the mobile base and the image capture assembly, the LIDAR unit configured to scan in a vertical direction and generate LIDAR data including a vertical array of distance and angle values representative of a plurality of object distances and angles from the LIDAR unit to a plurality of objects detected along the vertical scan of the LIDAR unit; and a master control unit including an operatively associated memory which stores instruction and a processor for executing the instructions, the control unit instructions configured to process the images acquired by the plurality of image capture devices at a sequence of locations during a movement of the mobile base in the retail environment, thereby extracting the product-related data from the images of the product display units captured by the plurality of image capture devices during the movement of the mobile base, and generating a profile of the retail environment indicating locations of one or more of the products, missing products and the tags throughout the retail environment based on the extracted product-related data, the LIDAR data, and the locations of the mobile base at the sequence of locations provided by the navigation component.

In still another embodiment of this disclosure, described is a retail environment robotic system comprising: a mobile base including an operatively associated navigating component configured to determine a location of the mobile base within a retail environment including a plurality of product display units arranged in a plurality of aisles, each product display unit including a plurality of product display fixtures, a plurality of products arranged on one or more shelves of the product display fixtures, and a plurality of tags attached to the shelves of the product display fixtures, each tag including product-related data including a barcode associated with a respective product proximately located on the product display fixture shelf near the tag; an image capture assembly operatively mounted on the mobile base, the assembly including a plurality of image capture devices for acquiring images of the product display units; a vertical scanning LIDAR (Light Detection and Ranging) unit operatively mounted to one of the mobile base and the image capture assembly, the LIDAR unit configured to scan in a vertical direction and generate LIDAR data including a vertical array of distance and angle values representative of a plurality of object distances and angles from the LIDAR unit to a plurality of objects detected along the vertical scan of the LIDAR unit; a master control unit including an operatively associated memory which stores instruction and a processor for executing the instructions, the control unit instructions configured to process the images acquired by the plurality of image capture devices at a sequence of locations during a movement of the mobile base in the retail environment, thereby extracting the product-related data from the images of the product display units captured by the plurality of image capture devices during the movement of the mobile base, and generating a profile of the retail environment indicating locations of one or more of the products, missing products and the tags throughout the retail environment based on the extracted product-related data, the LIDAR data, and the locations of the mobile base at the sequence of locations provided by the navigation component; a LIDAR data processing component operatively associated with the LIDAR unit and master control unit, the LIDAR data processing component configured to process the plurality of vertical arrays of object distances and angles to generate a depth map associated with the one or more product display units as the mobile base travels along an aisle, the depth map including a plurality of columns and a plurality of rows where each of the plurality of columns is associated with a single scan of the LIDAR unit at one of a plurality of locations along the aisle, and each of the plurality of rows is associated with one of a plurality of vertical distances; and a depth map processing component configured to identify regions of the depth map associated with regions of the one or more product display units which include one or more of the missing products, the products, the shelves, and the tags.

DETAILED DESCRIPTION

A LIDAR (Light Detection and Ranging) is a laser scanning device that generates an array of range values indicating the distance to an object where the index of the array corresponds to the angle of the sample. Basically, a LIDAR generates a depth map of the area in front of the unit. According to an exemplary embodiment of this disclosure, a LIDAR is mounted in a vertical orientation on a mobile robot and the robot is dispatched down an aisle of a retail store capturing a new LIDAR scan about every ¼ inch along the aisle.

Figure 12:
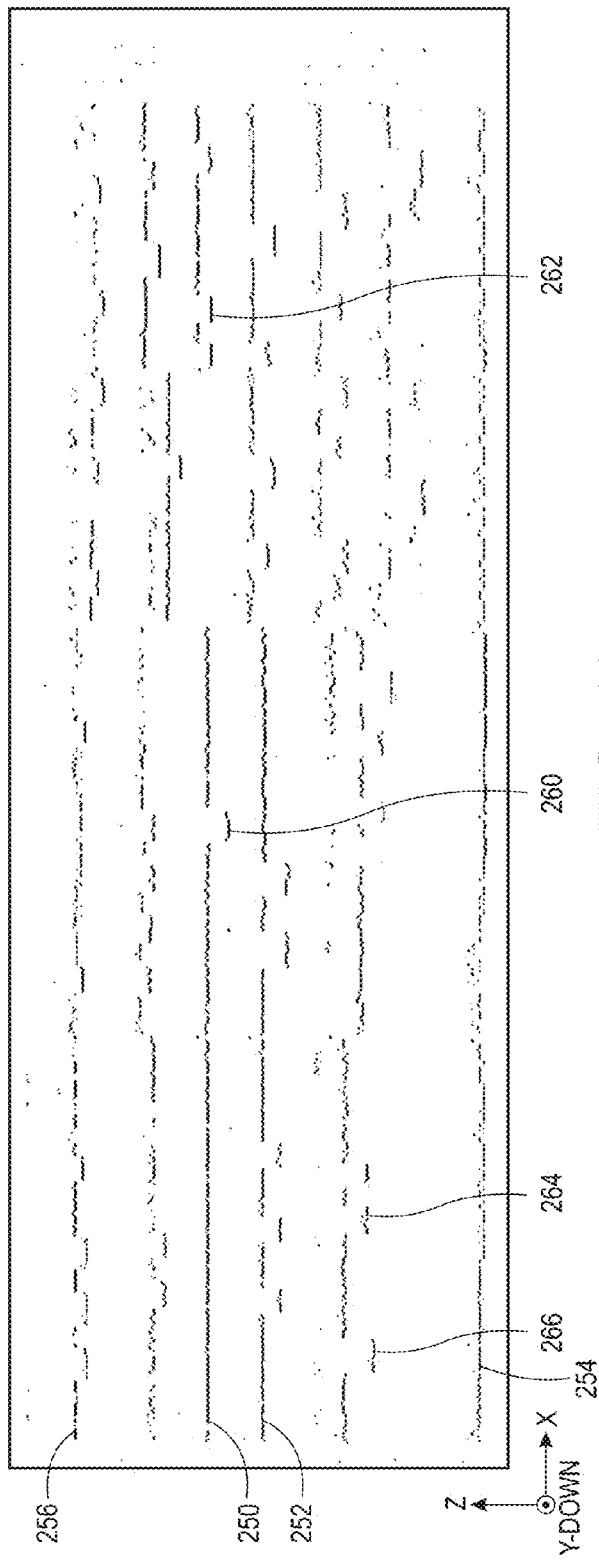
FIG. 12 is a plot of minimum distance LIDAR data from a sequential series of vertical scans taken along an aisle according to an exemplary embodiment of this disclosure.

FIG. 12 provides an example configuration, where LIDAR unit 220 is operatively associated with a dedicated mount 221 attached to a support frame 46. More specifically, a LIDAR is a laser rotating in circle combined with a sensor that can measure the distance to where the laser is striking an object. As the laser rotates, the sensor sends out a stream of distance measurements, one measurement per fraction of a degree of rotation. According to an exemplary embodiment, a LIDAR unit used is a Hokuyo URG-04LX-UG01. This unit can scan +/−120 degrees with a distance measurement made every ⅓ degree with a distance accuracy of about an inch. The LIDAR is oriented such that the scan is vertical instead of the normal horizontal, and the device is mounted on the robot at about ½ shelf height. According to the exemplary embodiment described herein, only a part of the full angular range of the device is used, i.e., about +/−45 degrees. Furthermore, the exemplary embodiment described herein uses a single LIDAR unit mounted on a mobile robot mast at a vertical distance approximately equal to the half vertical height of the shelves, however it is to be understood that other arrangements of LIDAR units, including multiple LIDAR units positioned vertically at ⅓ and ⅔ of the total shelf height, are within the scope of this disclosure and may provide an improvement in accuracy relative to a single LIDAR mount configuration.

Applications of the store shelf imaging systems described herein include automated, shelf-level retail prescriptive analytic services which utilizes a mobile image capture system to capture and store images of the display areas tagged with location information, analyze the images with location data and return the detailed store spatial layout and classification of (1) regular shelf signage (e.g., regular price labels with barcodes), (2) promotional shelf signage, and (3) products at the shelf display facings. This output can be used on its own for generating detailed views of current store product and signage layout, identifying misplaced or out of stock products or printing signage updates in store-walk order. This output can also be used in comparison with retailer standards or plan reference information to generate views of display conformance to aid in tracking and improving retailer operations.

With reference to FIGS. 1-5, illustrated is a mobile profile generation system 10 configured for determining a spatial layout 12 (FIG. 5) of the product content of a product facility, such as a retail store, warehouse, or the like, as well as incorporating a vertically scanning LIDAR unit to generate and process a depth map to produce detailed views of store products and associated displays including, but not limited to, missing product areas. The spatial layout may be referred to herein as a store profile. The store profile 12 may be in the form of a 2-dimensional or 3-dimensional plan of the store which indicates the locations of products, for example, by providing product data for each product, such as an SKU or barcode, and an associated location, such as x,y coordinates (where x is generally a direction parallel to an aisle and y is orthogonal to it), a position on an aisle, or a position on a predefined path, such as a walking path through the store. In some embodiments, the store profile may include a photographic panorama of a part of the store generated from a set of captured images, or a graphical representation generated therefrom.

Figure 1:
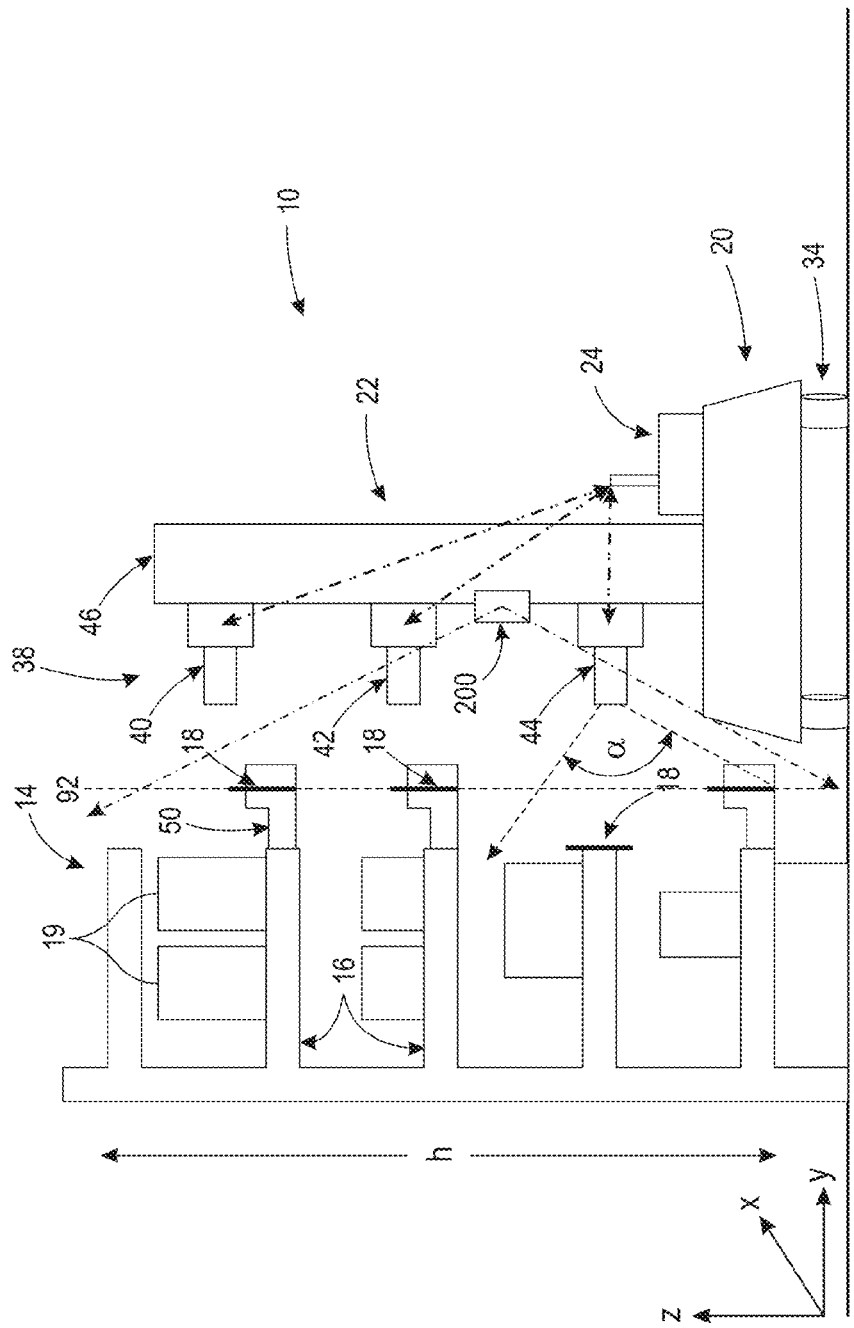
FIG. 1 is a schematic elevational view of a store profile generation system according to an exemplary embodiment of this disclosure.
Figure 2:
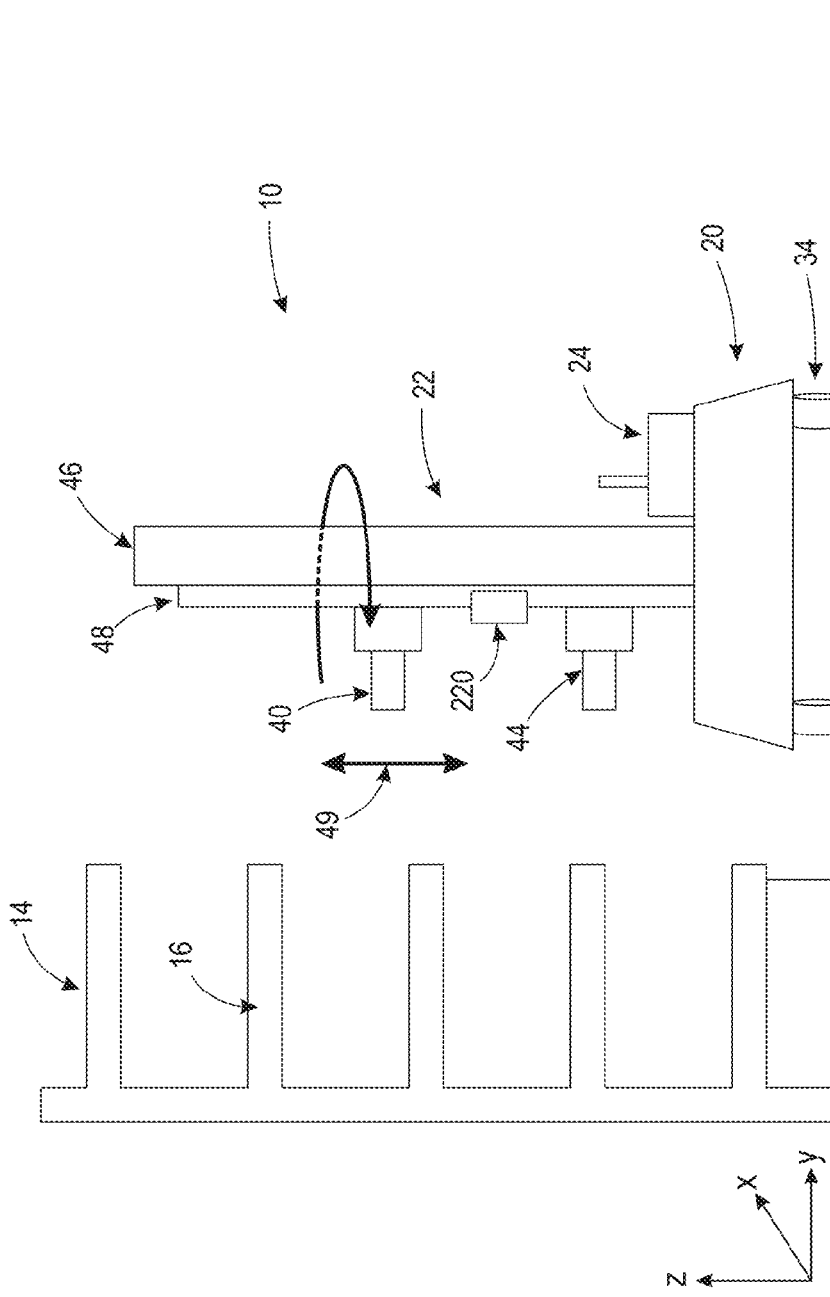
FIG. 2 is another schematic elevational view of a store profile generation system according to an exemplary embodiment of this disclosure.

The store profile 12 is generated by capturing images of product display units 14, such as store shelf units, at appropriate locations with appropriate imaging resolutions. As illustrated in FIG. 1, each shelf unit 14 may include two or more vertically-spaced shelves 16, to which product labels 18, such as product price tags, displaying product-related information, are mounted, adjacent related products 19. In the exemplary embodiments, the price labels are not on the products themselves, but on the shelf units, e.g., in determined locations. Thus, for example, a portion of a shelf which is allocated to a given product may provide for one (or more) price labels to be displayed for that product. In other embodiments the product labels 18 may be displayed on an adjacent pegboard or be otherwise associated with the respective display unit 14.

The exemplary profile generation system 10 includes a mobile base 20, an image capture assembly 22, a vertically scanning LIDAR 200 and a control unit 24, which are moveable as a unit around the product facility. The exemplary system 10 captures images within a product facility, such as a retail store, with the image capture assembly 22 at a sequence of locations of the mobile base 20, extracts product-related data 26 (e.g., printed barcodes and/or text from the captured product price labels) and location information from the images and the mobile base location, and constructs a store profile 12 (e.g., a 2D map, as discussed above) which defines a spatial layout of locations of the shelf labels 18 within the store. In addition, as will be further described below, the LIDAR unit 200 vertically scans at a sequence of locations to generate a depth map which is further processed to extract details about the product facility.

Figure 5:
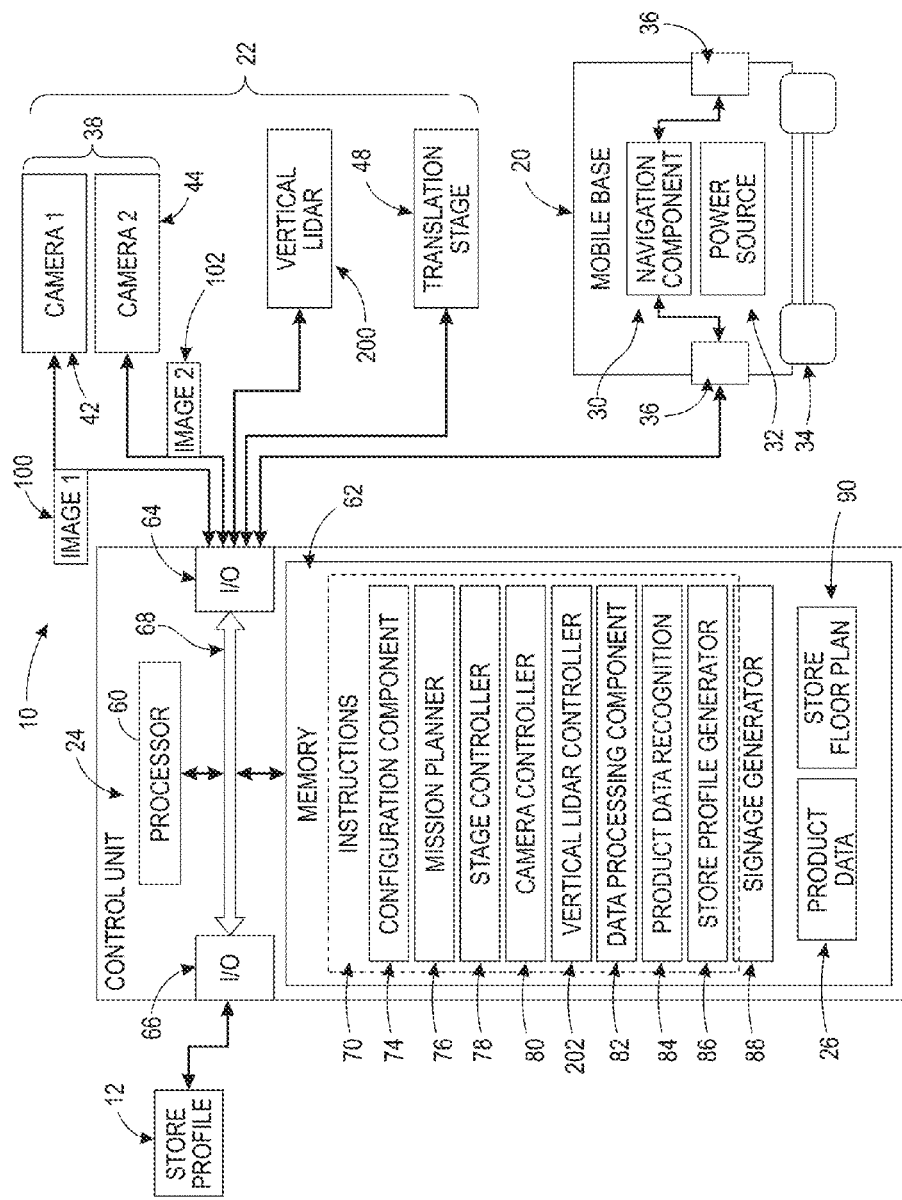
FIG. 5 is a functional block diagram of the store profile generation system shown in FIGS. 1-4 in accordance with an exemplary embodiment of this disclosure.

The mobile base 20 serves to transport the image capture assembly 22 and LIDAR unit 200 around the product facility and may be fully-autonomous or semi-autonomous. In one embodiment, the mobile base 20 is responsible for navigating the system 10 to a desired location with a desired facing (orientation), as requested by the control unit 24, and reporting back the actual location and facing, if there is any deviation from the request. As illustrated in FIG. 5, in a fully-autonomous mode, the motorized mobile base 20 may include a navigation component 30 and an associated power source 32, such as a battery, motor, drive train, etc., to drive wheels 34 of the of the mobile base in order to move the system 10 to a desired location with desired facing according to a request from the control unit 24. The navigation component 30 may be similarly configured to the control unit 24 and may include memory and a processor for implementing the instructions provided by the control unit and reporting location and orientation information back to the control unit. Position and/or motion sensors 36 provide the navigation component 30 with sensing capability to confirm and/or measure any deviation from the requested location and orientation. These may be used by the navigation component for identifying the location, orientation, and movement of the mobile base for navigation and for store profile generation by the control unit. One suitable mobile base which can be adapted to use herein is a Husky™ unmanned ground vehicle obtainable from Clearpath Robotics Inc., 148 Manitou Dr., Kitchener, Ontario N2C 1L3, Canada, which includes a battery-powered power source.

In a semi-autonomous mode, the mobile base 20 is pushed by a person (e.g., as a cart), and thus the power source and optionally also the navigation component may be omitted. In some embodiments, the navigation component and sensors may be used in the semi-automated mode to confirm and/or measure any deviation from a requested location and orientation (e.g., by using voice feedback to confirm the aisle/shelf information or using image features of the scene).

The image capture assembly 22 includes an imaging component 38 which includes one or more image capture devices, such as digital cameras 40, 42, 44, that are carried by a support frame 46. The image capture devices capture digital images, such as color or monochrome photographic images. The support frame may be mounted to the mobile base 20 and extend generally vertically (in the z-direction) therefrom (for example, at an angle of from 0-30° from vertical, such as from 0-20° from vertical). The cameras are configured to capture images of a full height h of the shelf unit, or at least that portion of the height h in which the labels 18 of interest are likely to be positioned throughout the facility.

Figure 3:
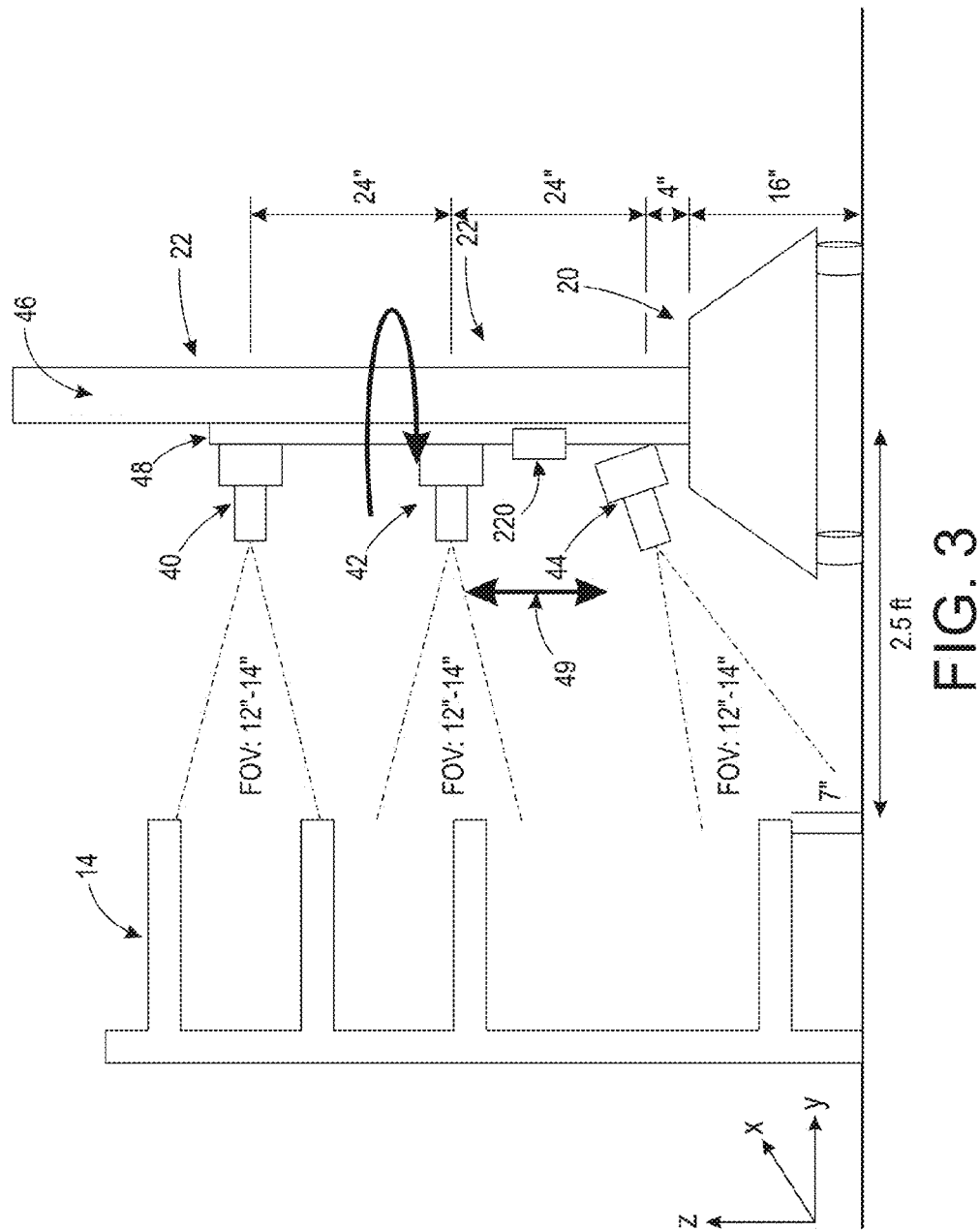
FIG. 3 is another schematic elevational view of a store profile generation system according to an exemplary embodiment of this disclosure.
Figure 4:
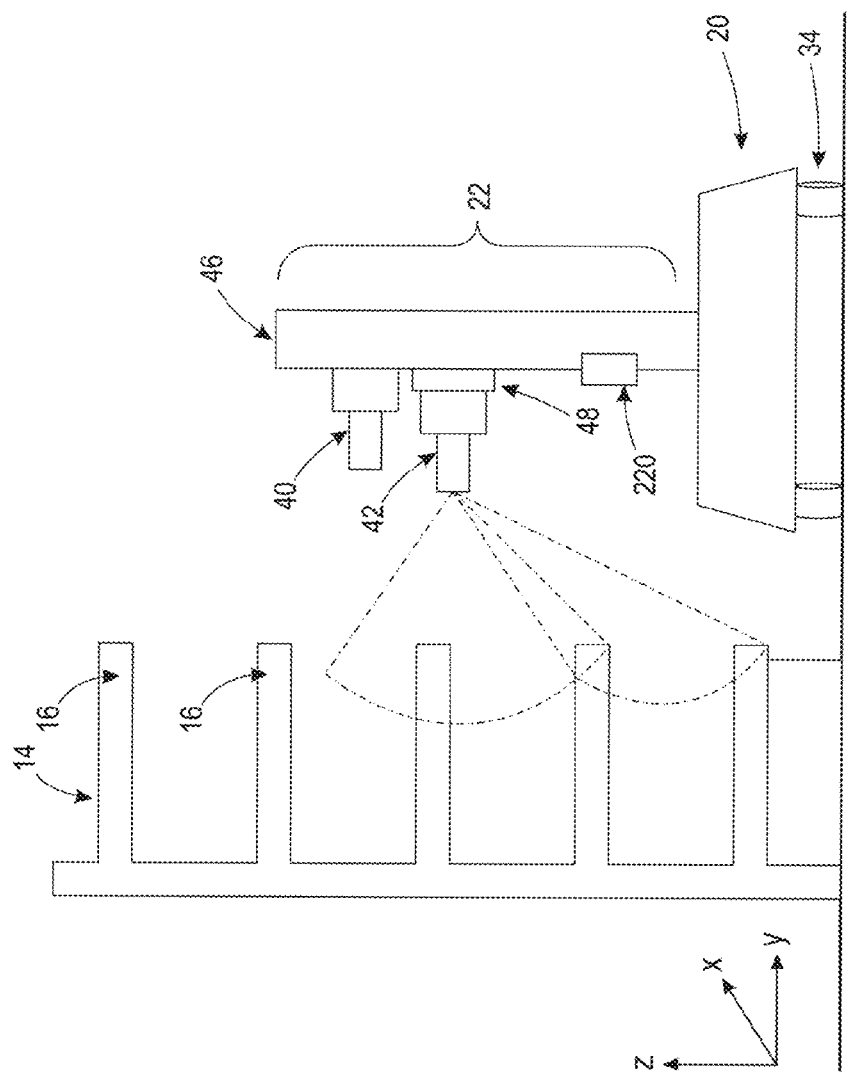
FIG. 4 is a schematic elevational view of a store profile generation system in accordance with another aspect of an exemplary embodiment of this disclosure.

One or more of the camera(s) 40, 42, 44 may be moveable, by a suitable mechanism, in one or more directions, relative to the support frame 46 and/or mobile base 20. In one embodiment, at least one of the cameras has a first position and a second position, vertically-spaced from the first position, allowing the camera to capture images in the first and second positions. In the embodiment illustrated in FIGS. 2 and 3, for example, the support frame 46 includes a translation stage 48 for moving one or more of the camera(s) in at least one direction, such as generally in the z (vertical) direction, as illustrated by arrow 49. The direction of movement need not be strictly vertical if the support translation stage is mounted to an angled support frame, as noted above. Optionally, the translation stage 48 provides for rotation of one or more of the cameras in the x,y plane and/or tilting of one or more of the cameras, relative to the translation stage/support frame. In another embodiment, the cameras, and/or their associated mountings, may provide the cameras with individual Pan-Tilt-Zoom (PTZ) capability. The pan capability allows movement of the field of view (FOV) relative to the base unit in the x direction; the tilt capability allows the field of view to move in the z direction as illustrated for camera 44 in FIG. 3; the zoom capability increases/decreases the field of view in the x,z plane (which may be measured in units of distance, such as inches or cm, as illustrated in FIG. 3, or angle α, as illustrated in FIG. 1). In some embodiments, only some, i.e., fewer than all, of the cameras are moveable and/or have PTZ capability, as illustrated in FIG. 4, where only camera 42 has such capabilities. The incremental movement of the mobile base 20 allows images to be captured along the length of the shelf unit 14 (in the x direction).

Figure 6:
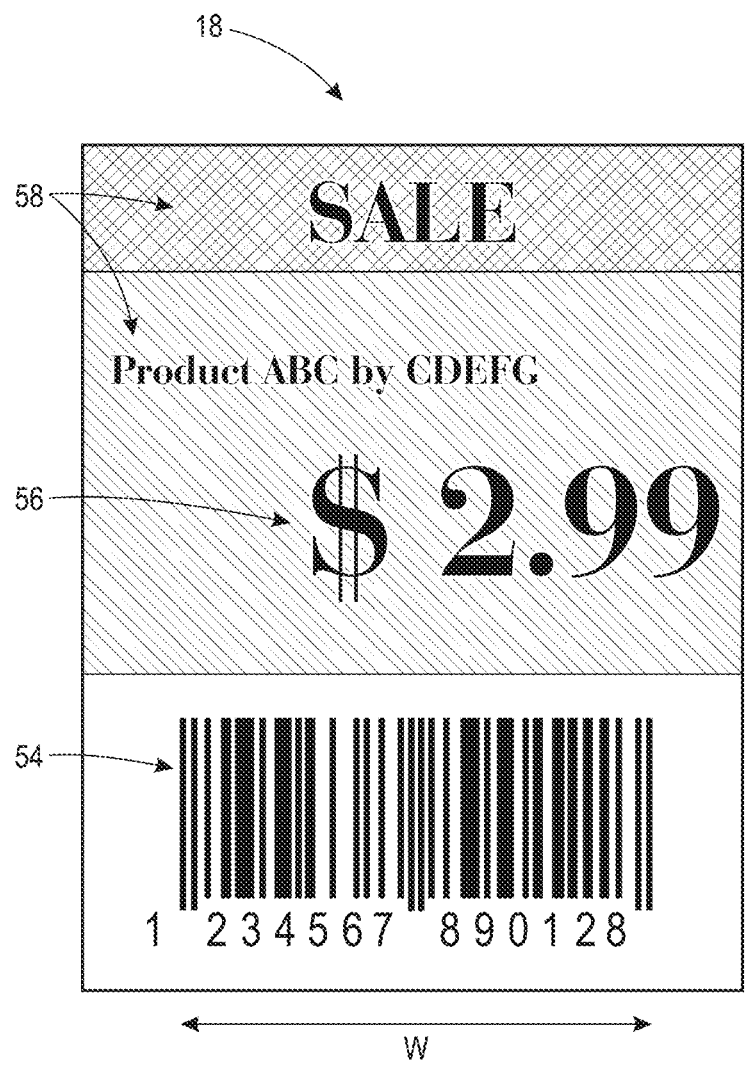
FIG. 6 illustrates an exemplary price tag.

The image capture assembly 22 serves to capture a series of images containing shelf product labels 18 (FIG. 1), such as product price tags, at sufficient resolution for analysis and product recognition. The product price or tags 18 may be located on the outer edge of a shelf or at the end of a pegboard hook 50, or other product label mounting device. As illustrated in FIG. 6, each price tag 18 generally includes a unique identifier 54 for the product, such as a 1 or 2-dimensional barcode or stock keeping unit (SKU) code. As an example, a 1D EAN-13 code may be printed on or otherwise affixed to the product label. 2D barcodes are commonly referred to as QR codes or matrix codes. In addition, a human-readable price 56 and optionally some descriptive text 58 may be printed on or otherwise affixed to the product label.

A width w of the barcode 54 in the y direction may be about 20-25 mm on many price tags. However, the barcode width may not be uniform throughout the store or from one store to another. In order to allow accurate imaging and decoding of such barcodes, a minimum resolution of approximately 200 pixels per inch (ppi) (78 pixels per centimeter) at the object plane with sufficient depth of focus to allow for differences in x direction position or tilt of the price tags relative to the camera is desirable. For smaller barcodes and 2D barcodes, a higher resolution may be appropriate. A digital camera mounted to a support frame 46 so that it can be relatively stationary while capturing images is thus more suited to this task than a hand-held smartphone camera or inexpensive webcams, unless the acquisition is performed close up (e.g., one barcode at a time with the camera placed very close to the barcode) and the camera is held sufficiently steady. Furthermore, although the locations of price tags are somewhat systematic, there are large variations from shelf to shelf, store to store, and chain to chain, as well as differences in lighting conditions, print quality, transparency of the product label mounting device 50 (if it overlays the product label 18), and so forth. Thus, it may be appropriate to change the design and/or adjust the configuration of the cameras, depending on the expected conditions within the store or portion thereof. An exemplary image capture assembly 22 is adaptable to accept different numbers of cameras and/or different camera capabilities, as described in further detail below.

The exemplary control unit 24 provides both control of the system and data processing. The control unit 24 includes one or more dedicated or general purpose computing devices configured for performing the method described in FIG. 7. The computing device may be a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated, although the control unit 24 is illustrated as being physically located on the mobile base 20 (FIG. 1), it is to be appreciated that parts of the control unit may be in the image capture assembly 22 or located on a separate computer remote from the mobile base and image capture assembly.

The control unit 24 illustrated in FIG. 5 includes a processor 60, which controls the overall operation of the control unit 24 by execution of processing instructions which are stored in memory 62 communicatively connected with the processor 60. One or more input/output interfaces 64, 66 allow the control unit to communicate (wired or wirelessly) with external devices. For example, interface 64 communicates with cameras 40, 42, 44 to request image capture, and/or adjustments to the PTZ settings, and to receive captured digital images from the cameras; with translation stage 48, where present, to adjust camera position (s); with mobile base 20 for movement of the system as a whole, relative to the shelf unit, and the like. In addition, input/output interfaces provide control of vertical LIDAR 200 to perform scans required to generate LIDAR data further processed to generate a depth map. Interface 66 may be used for outputting acquired or processed images, a store profile 12, and/or information extracted therefrom, such as to an external computing device and/or a printer (not shown) for printing and/or packaging sale signage in an appropriate order to match the store profile.

The various hardware components 60, 62, 64, 66 of the control unit 24 may be all connected by a bus 68.

The memory 62 may represent any type of non-transitory computer readable medium such as random access memory (RAM), read only memory (ROM), magnetic disk or tape, optical disk, flash memory, or holographic memory. In one embodiment, the memory 62 comprises a combination of random access memory and read only memory. In some embodiments, the processor 60 and memory 62 may be combined in a single chip. The interface 64, 66 allows the computer to communicate with other devices via a wired or wireless links or by a computer network, such as a local area network (LAN) or wide area network (WAN), or the internet, and may comprise a modulator/demodulator (MODEM), an electrical socket, a router, a cable, and and/or Ethernet port. Memory 62 stores instructions for performing the exemplary method as well as the processed data 12.

The digital processor 60 can be variously embodied, such as by a single-core processor, a dual-core processor (or more generally by a multiple-core processor), a digital processor and cooperating math coprocessor, a digital controller, or the like. The digital processor 60, in addition to controlling the operation of the computer 62, executes instructions stored in memory 62 for performing the methods provided herein.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 7:
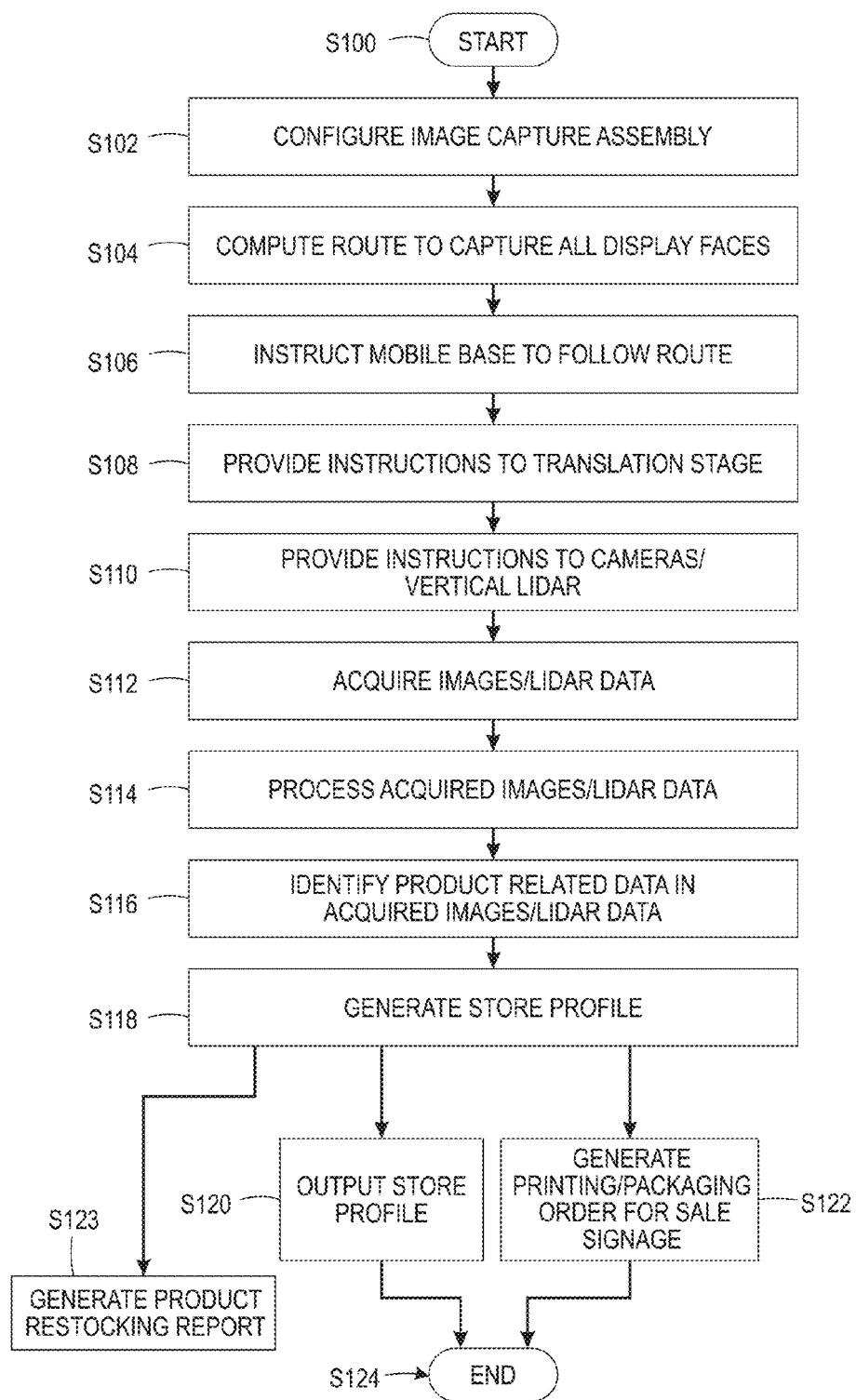
FIG. 7 is a flow chart illustrating a store profile generation method in accordance with an exemplary embodiment of this disclosure.

The processor 60 executes instructions 70 stored in memory 62 for performing the method outlined in FIGS. 7 and/or other methods described herein. In the illustrated embodiment, the instructions include a configuration component 74, a mission planner 76, a translation stage controller 78, a camera controller 80, a vertical LIDAR controller 202, an image data processing component 82, a product data recognition component 84, a store profile generator 86, and a signage generator 88. Fewer than all these components may be included in some embodiments. In other embodiments, some or all of the components may be located on a separate computing device, i.e., one which is not carried by the mobile base, as discussed above.

The configuration component 74 is used prior to a mission to configure the image capture assembly 22 (e.g., determine FOV and position(s) of the camera(s) and to provide a spatial characterization of the image capture assembly, such as a spatial profile for each camera. Each camera may have at least one camera spatial profile. A camera may have two or more spatial profiles if the camera is to be moved, relative to the mobile base, and/or its FOV adjusted, for acquiring more than one image at the same mobile base location. The camera spatial profile may be a mapping between pixel location and a location in an x,z plane to enable a mapping between pixels of each image captured at a respective camera position and a position in the x,z plane corresponding to a portion of a shelf face where the images are captured.

The mission planner 76 has access to a store floor plan 90 (layout of aisle and shelves and its facing) and the purpose of each mission. A mission may be for example, to capture all price tags or identify missing products throughout the store, or limited to only a part of the store, etc. Using the information in the store floor plan 90, the mission planner determines the path that the mobile base 20 should follow and communicates with the mobile base to provide the path and appropriate stop positions (where the images should be acquired by the image capture assembly). The instructions may be provided to the mobile base in a step-by-step fashion or in the form of a full mission.

The translation stage controller 78 determines the translations of the translation stage to achieve desired camera positions and communicates them to the translation stage 48. The camera controller 80 determines the camera parameters (e.g., shutter speed, aperture, ISO number, focal length, . . . ) and optionally position parameters (e.g., pan, tilt, zoom, or vertical translation amount . . . ) of the cameras in the image capture assembly for each position that requires image acquisition. These parameters may be fixed throughout the mission and/or adjusted dynamically based on current location information of the mobile base (e.g., distance to the shelf to be imaged, the facing angle, height of the shelf . . . ). As will be appreciated, translation stage controller 78 and camera controller 80 may form parts of a single component for controlling the acquisition of images by the image capture assembly 22.

The image data processing component 82 processes the images acquired by all the cameras and uses the mapping provided by the configuration component and position information provided by the mobile base to map pixels of the captured image to locations in 3D space.

The product data recognition component 84, which may be a part of the image data processing component 82, analyses the processed images for detecting price tag locations, extracting product data 26, such as price tag data, and performs image coordinate conversion (from pixel position to real-world coordinates).

Outputs of the data processing component 82 and/or product data recognition component 84 may be used by the store profile generator 88 to determine the store profile 12 (e.g., the real-world coordinates of detected and recognized UPC codes). In some cases, outputs of the data processing component 82 and/or product data recognition component 84 are used by the translation stage controller 78 and/or camera controller 80 to determine what should be the appropriate camera parameters and/or position parameters for the next image capture. Some outputs of the data processing component 82 and/or product data recognition component 84 may be used by the mission planner 76 to determine the next positional move for the mobile base 20.

With reference now to FIG. 7, a method for generating (and using) a store profile 12 is shown, which can be performed with the system of FIGS. 1-5. As will be appreciated, some or all of the steps of the method may be performed at least partially manually and need not be performed in the order described. The method begins at S100.

At S102, the image capture assembly 22 is configured. Briefly, the configuration component 74 identifies suitable positions for the cameras 40, 42, 44, and optionally a suitable range of camera parameters (e.g., field of view, exposure time, ISO number, etc.), in order to capture the full height h of each shelf unit face from a set of overlapping images acquired at one single position of the moveable base (i.e., without gaps in the z direction). The configuration component 74 optionally extracts information from test images which enables it to associate each (or some) pixels of a captured image with a point in yz space and/or to generate a spatial characterization of the image capture assembly which may include a spatial profile for each camera.

Figure 8:
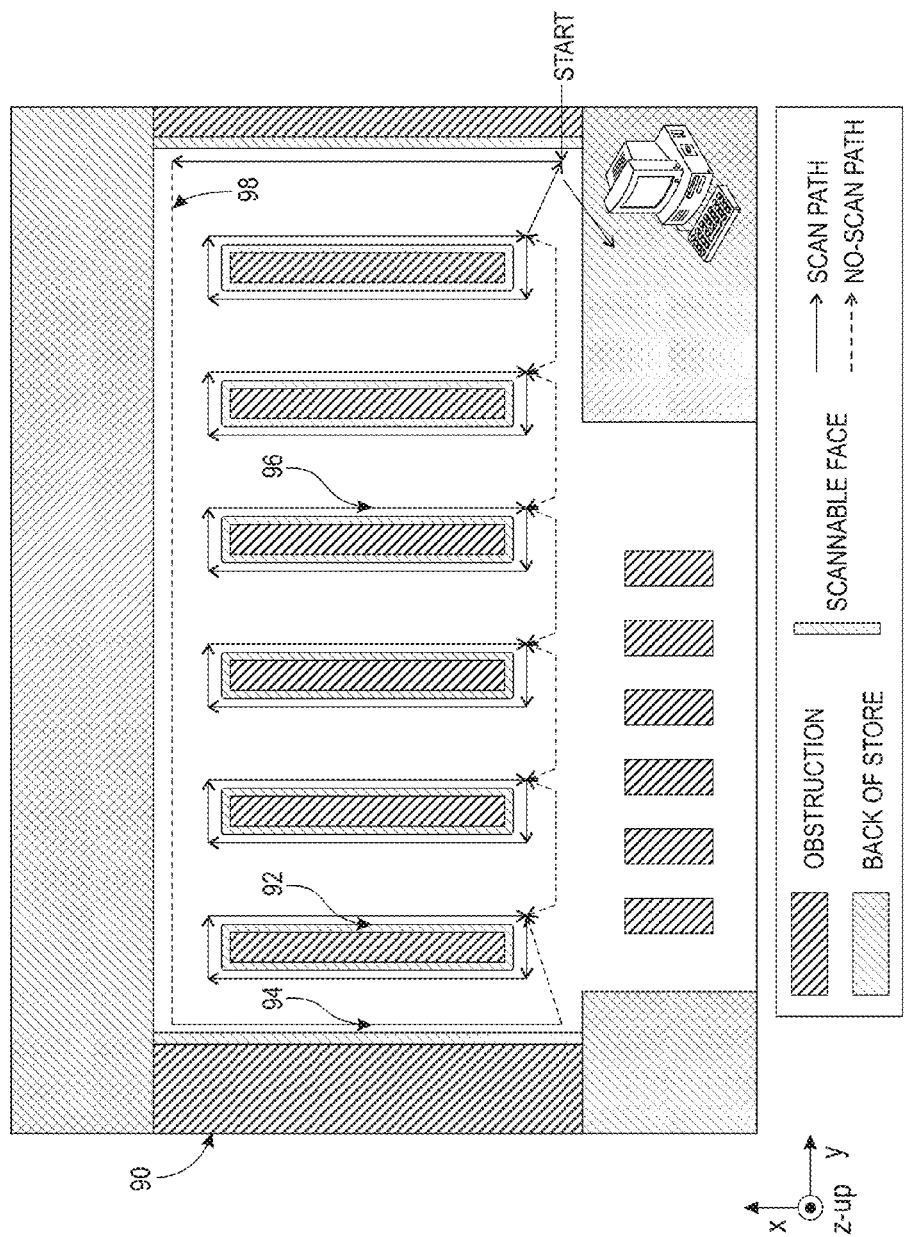
FIG. 8 is a map of a store including a route for a store profile generation system according to an exemplary embodiment of this disclosure.

At S104, a route for scanning the store shelves is computed. In particular, the mission planner 76 computes a route for the mobile base around the facility, based on a store floor plan 90. The floor plan identifies obstructions, particularly locations of shelf units. The store plan may have been generated partially automatically, from a prior traversal of the facility by the system 10, for identifying the location of obstructions. For example, as shown in FIG. 8, the obstructions may be identified on the floor plan 90 and locations of scannable faces 92 on each shelf unit identified (e.g., by a person familiar with the store). The mission planner 76 computes a route 94, which includes all the faces 92 and designates parts of the route as a scan path 96 (where images of scannable faces 92 are to be acquired) and parts of the route as a no-scan path 98 (where no images are to be acquired).

At S106, the mission planner 76 communicates the computed route 94 to the navigation component 30 of the mobile base, and optionally designating stop positions, which may be located at approximately equal intervals along the scan path 96. During the mission, the mission planner 76 receives information from the navigation component 30 from which any deviations to the planned route are computed. The mobile base 20 is then responsible for navigating the system 10 to a desired location with desired facing (orientation) requested by the control unit 24 and reporting back the actual location and facing if there is any deviation from the request.

At S108, as the mobile base 20 traverses the route 94, instructions are provided to the translation stage 48 at each predetermined stop on the scan path 96 for positioning the cameras. The translation stage controller 78 communicates instructions to the translation stage 48 when the camera position(s) is/are to be adjusted and may provide the translation stage 48 with directions for achieving predetermined camera positions, based on the information generated by the configuration component 74.

At S110, at each predetermined stop on the scan path 96, instructions are provided to the cameras 40, 42, 44 themselves for positioning and image acquisition. In particular, the camera controller 80 communicates instructions for adjusting position and/or focal plane to the camera's PTZ components and provides instructions for data acquisition to provide the optimal coverage of the shelf, using the position information identified by the configuration component 74. The translation stage controller 78 and camera controller 80 may work in cooperation to achieve desired positions of the cameras. In addition, instructions can be provided to the vertical LIDAR to vertically scan and generate LIDAR data to provide depth information for further processing.

At S112 images 100, 102, are acquired by the cameras at a given position of the mobile base. The image capture assembly (iteratively) acquires images based on the requests by the control unit and the camera parameters and (optionally) position parameters provided. In addition, LIDAR data may be acquired by the LIDAR unit 200.

At S114, the acquired images 100, 102 and LIDAR data are transferred from the camera memory to the data processing component 82. The data processing component 82 receives the images acquired by the cameras and stores them in memory, such as memory 62, and may perform preliminary processing, such as adjustments for blur, color, brightness, etc. A composite image or panorama of the shelf face may be computed by performing a union of multiple images captured by the image capture assembly. In forming the composite image, pixels of one or more of the acquired images may be translated to account for each camera's spatial profile.

At S116, the product data recognition component 84 processes the acquired images 100, 102, LIDAR data and/or panorama to identify product data 26 from the captured shelf labels 18, where present, in the images as well as product placement, shelf details, and/or label details from the LIDAR data. In an exemplary embodiment, the acquired images and a corresponding coarse location and facing information are analyzed to determine the product layout information (e.g., via barcode recognition of price tags and knowledge of the camera spatial profile).

The process repeats until the mission is completed (e.g., all aisles of interest have been scanned). For a typical mission, the mobile base moves along each store aisle to enable images of the scannable faces of each shelf unit to be captured. From the captured images, each shelf price tag is detected and its location determined within the image.

By measuring the mobile base's current position in the store floor plan, its position data can then be associated with the images being captured at that position, based on the time of capture. Candidate regions of each image 100, 102 which have at least a threshold probability of including a barcode 54 are identified and processed to extract the barcode information, which may be output as an SKU code which uniquely identifies the product. Associated information, such as price and product information 56, 58, particular colors used in the product label 18, and the like, may also be used to locate the barcode and/or to decipher it, particularly where the product data recognition component has difficulty in doing so based on the barcode alone. The location of the barcode in three dimensional space can be determined based on the location of the mobile base at the time the image was captured and the spatial characterization of the image capture assembly.

At S118, a store profile 12 is generated based on the identified barcode information 26 and computed barcode locations. In particular, the store profile generator 86 generates a store profile 12 which identifies locations of the price tags 18, based on the extracted barcode information and optionally information provided by one or more of the configuration component 74, mission planner 76, and navigation component 30, through which pixels of identified barcodes in the captured images are associated with a point in real (xyz or xy) space or otherwise generally located with respect to the store floor plan 90. An accurate store profile 12 identifying product locations/locations of price tags in a store can thus be reconstructed.

At S120, the store profile 12 may be output from the system.

At S122, information on signage to be mounted throughout the store may be received and a packaging order for the particular store computed, based on the store profile 12. In particular, the signage generator 88 receives information on signage to be printed for an upcoming sale in which only some but not all of the price tags may need to be replaced. The signage generator uses the store profile 12 to identify the locations of only the price tags/products to which the sale relates. From this information, a printing and/or packaging order for the signage is generated. When the signage is packaged and provided to an employee, the order in which the signage is packed in accordance with the computed printing and/or packaging order enables the person to traverse the store in the order in which the signage is packaged to replace/add the new signage, generally in a single pass through the store. The route defined by the packing order minimizes the amount of backtracking the employee needs to do and/or provides for a shorter path (in time or distance) to complete the task than would be achievable without the computed store-specific packaging order, and avoids the need for the store to resort the signage into an appropriate order. In this way, for each store in a chain, a store profile can be generated (e.g., periodically), allowing a store-specific packaging order for signage to be computed each time a set of shelf labels 18 and/or other signage is to be mounted throughout the store.

At S123, a product restocking report may be generated based on vertical scanning the LIDAR data which provides missing product detection.

The method ends at S124.

Further details of the vertical scanning LIDAR system and method are now described.

Figure 9:
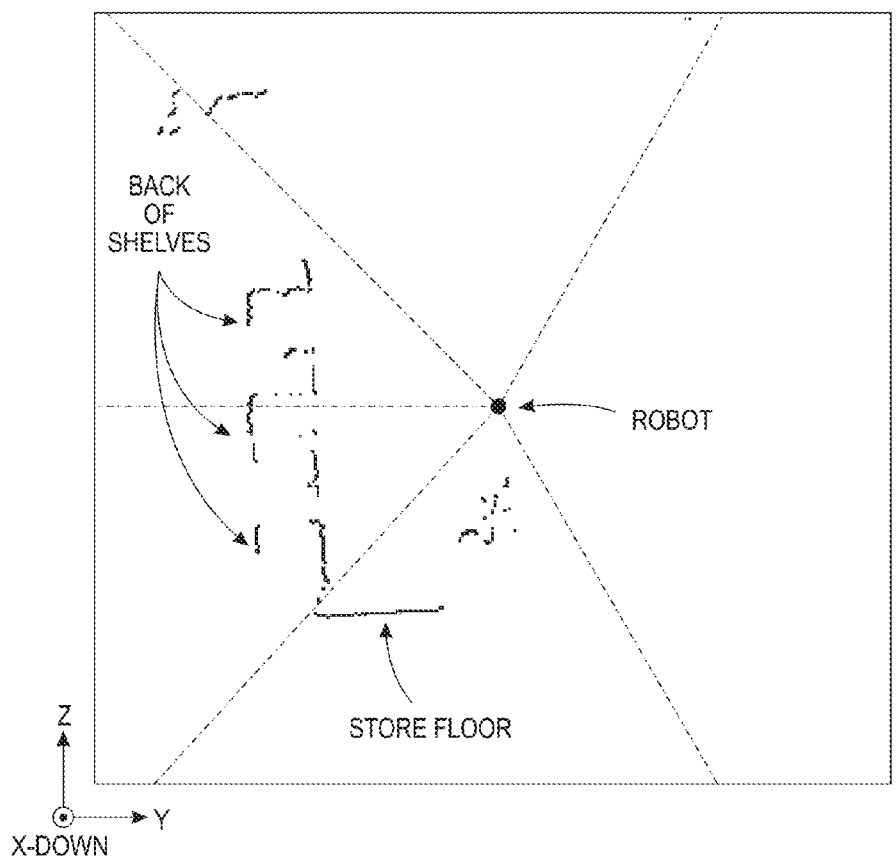
FIG. 9 is a plot of an original vertical scan of a store aisle using a vertical scanning LIDAR according to an exemplary embodiment of this disclosure.

FIG. 9 is a plot of an original vertical scan of a store aisle using a vertical scanning LIDAR according to an exemplary embodiment of this disclosure. The center dot represents the vertically scanning LIDAR unit mounted on a robot, i.e., mobile base. The other dots represent the endpoints of each scanning location and are the depth map for that scan. The horizontal region at the bottom is the store floor which is where the product shelves begin. Also visible are some areas that are farther left than others—those represent areas where the laser could see the back of the shelves, i.e. either missing product or small areas between the top of a product and the next shelf. The problem addressed in this disclosure is how to take these scans and determine the shelf locations, missing products, and promotional tag locations.

The system and method disclosed operates by generating a depth map of the aisle by combining all the vertical scans along the aisle into a pixel image where each column of the pixel image represents one scan, and each row of the image corresponds to a vertical distance from the ground up, and each pixel value associated with the pixel image represents a distance to an obstruction (the range) detected by the LIDAR. According to one exemplary embodiment, the analysis is restricted to +/−45 degrees vertically offset from the floor which limits to the shelf region rather than the floor or ceiling. However, other embodiments may use or require other vertical offsets based on shelf height and the distances of the shelves from the LIDAR, as is further described below. This restriction is determined during system calibration and is dependent on shelf height and the distance the robot is from the shelf along the aisle when the scan is generated. To generate a pixel location and associated value from the LIDAR data, a standard polar to Cartesian conversion is used as follows:

$$X = R * \cos(\theta); \text{ and}$$

$$Y = R * \sin(\theta);$$

where R is the measured distance range and θ is the associated angle of the measured distance range. A pixel value is generated by initially determining the smallest X (point closes to the robot) and considering that point the front of a shelf (MinX). According to the exemplary embodiment described herein, the maximum shelf depth is 15 inches, so a pixel value is generated for each scan sample with the equation $$px = \begin{cases} 0, & X = 0 \\ 255 - (X - \text{Min}X) * \dfrac{(255 - 32)}{15}, & X > 0 \end{cases}$$

Figure 10:
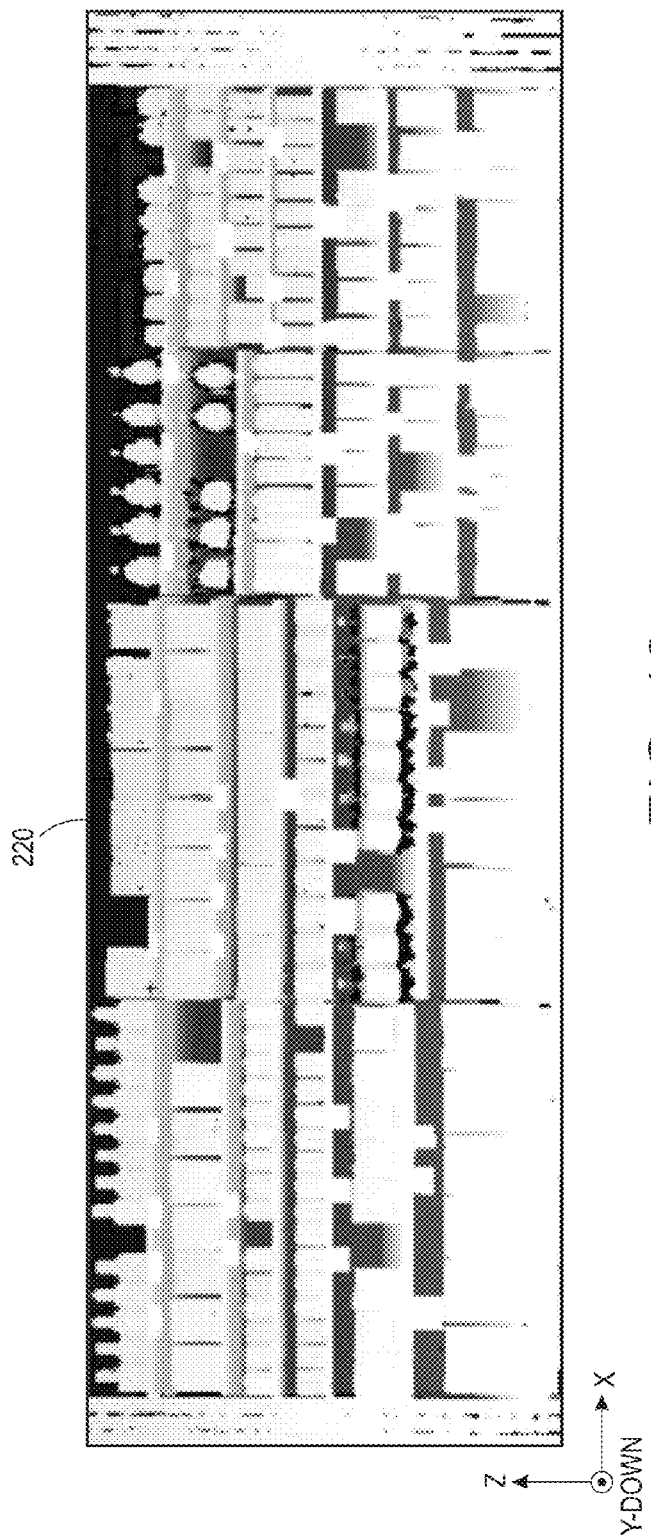
FIG. 10 is a rendering of a pixel image generated of an aisle and associated product display unit generated by converting vertically scanned LIDAR data from standard polar coordinates to Cartesian coordinates

If the LIDAR was not able to measure a distance range for some reason (e.g., non-reflective surface or too great a distance) then X will be 0 which represents a black pixel. Otherwise, a gray value is associated with each pixel that ranges between 32 and 255, where 255 is a point closest to the robot (front of the shelf) and 32 is a point at a maximum distance from the robot (back of the shelf). FIG. 10 is an example of the resulting pixel image 220.

As indicated in FIG. 10, the resulting pixel image shows where shelves are located and where products are missing, and also includes evidence of promotional tags. Next, the exemplary system and method automatically locates shelves, missing products and promotional tags within the resulting pixel images. The basic steps to determining these results include the following:

A) Determine the shelf locations.

B) Scan just above the shelf locations and search for dark areas indicating missing products.

C) Scan just below the shelf to look for small bright areas that potentially correspond to promotional tags.

Various details of these steps are now provided below.

A) Determine Shelf Location

Figure 11:
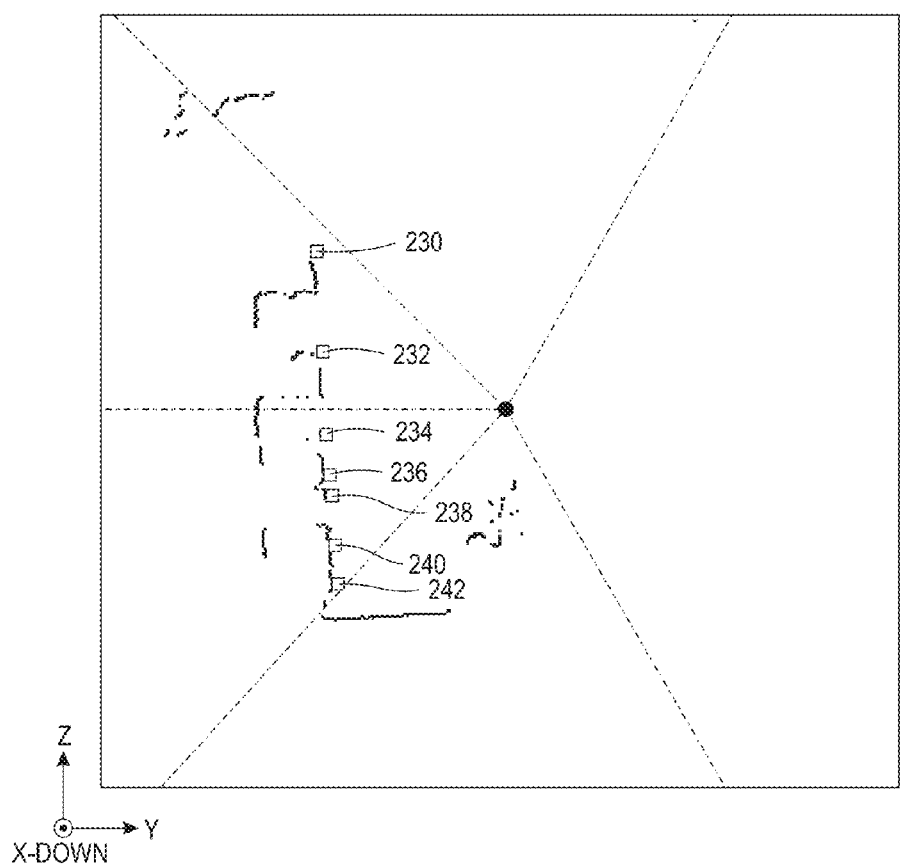
FIG. 11 is another plot of the vertical scan shown in FIG. 9 where LIDAR data including minimum distances of a detected object from the LIDAR are identified as squares for a single vertical scan.

With reference to FIG. 10, shown is an initial resulting pixel image prior to processing according to steps A)-C). As indicated in FIG. 10, shelf edges have a signature resulting from the fact that they are usually the closest points to the robot. To locate the shelves, the system must analyze the LIDAR scans and find the closest points to the robot. Since shelf edges are not always directly on top of each other, the system finds closest points in local regions by running a sliding window over the LIDAR scan and keeping only those points that are 1) closest to the robot within the window, and 2) show a significant variation in depth within the sliding window, and 3) are reasonably close to the MinX from above. FIG. 11 shows a LIDAR scan with the minimum distances marked as solid blocks 230, 232, 234, 236, 238, 240, 242.

Figure 13:
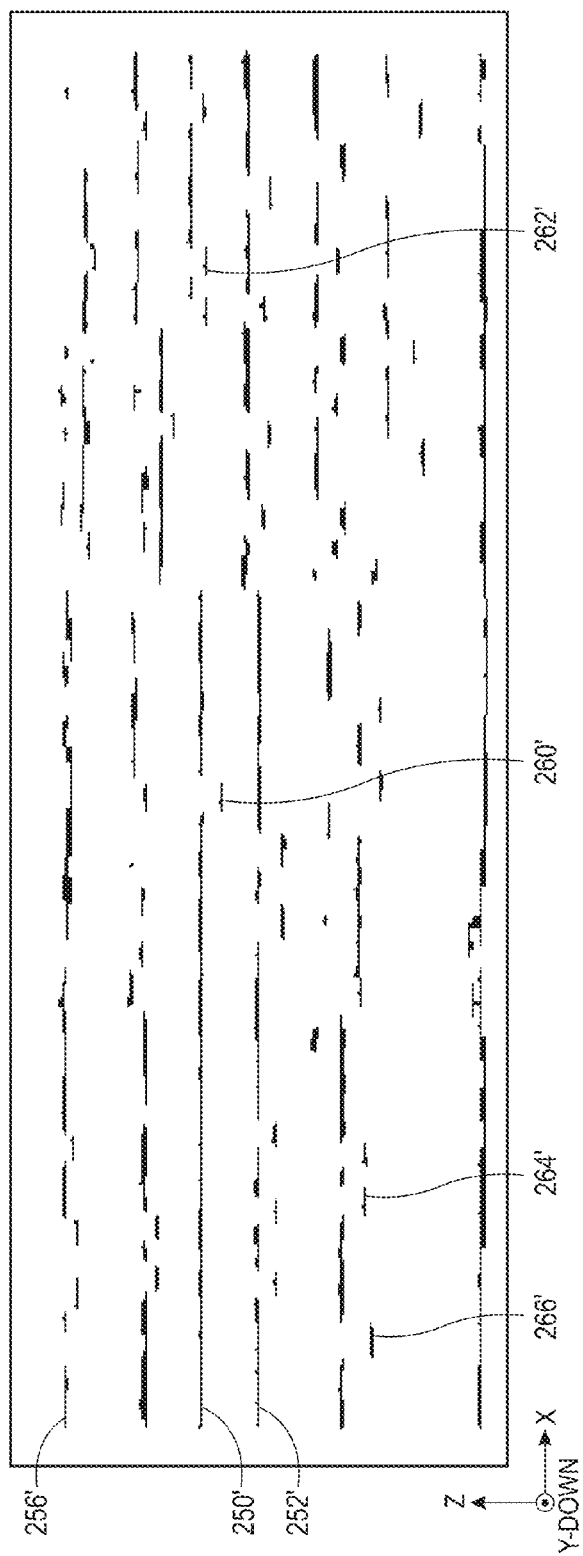
FIG. 13 is a plot of the minimum distance LIDAR data shown in FIG. 12 after the LIDAR data is further processed to reduce noise and join broken linear segments.

The minimums of all the scans are taken and plotted in an image as shown in FIG. 12. As indicated in FIG. 12, clearly the shelves, for example shelves 250, 252, 254, 256, are visible but there is a lot of noise. In addition, FIG. 12 shows where the promotional tags break up the shelves, for example PPTs 260, 262, 264, 266. With the minimum points plotted in an image, morphological operations can now be applied to reduce noise and try to join broken linear paths, which is shown in FIG. 13. Morphological operations include the morphological close operation which is an image processing operation designed to eliminate small white holes in an image without affecting black structure—a noise removal operation.

Figure 14:
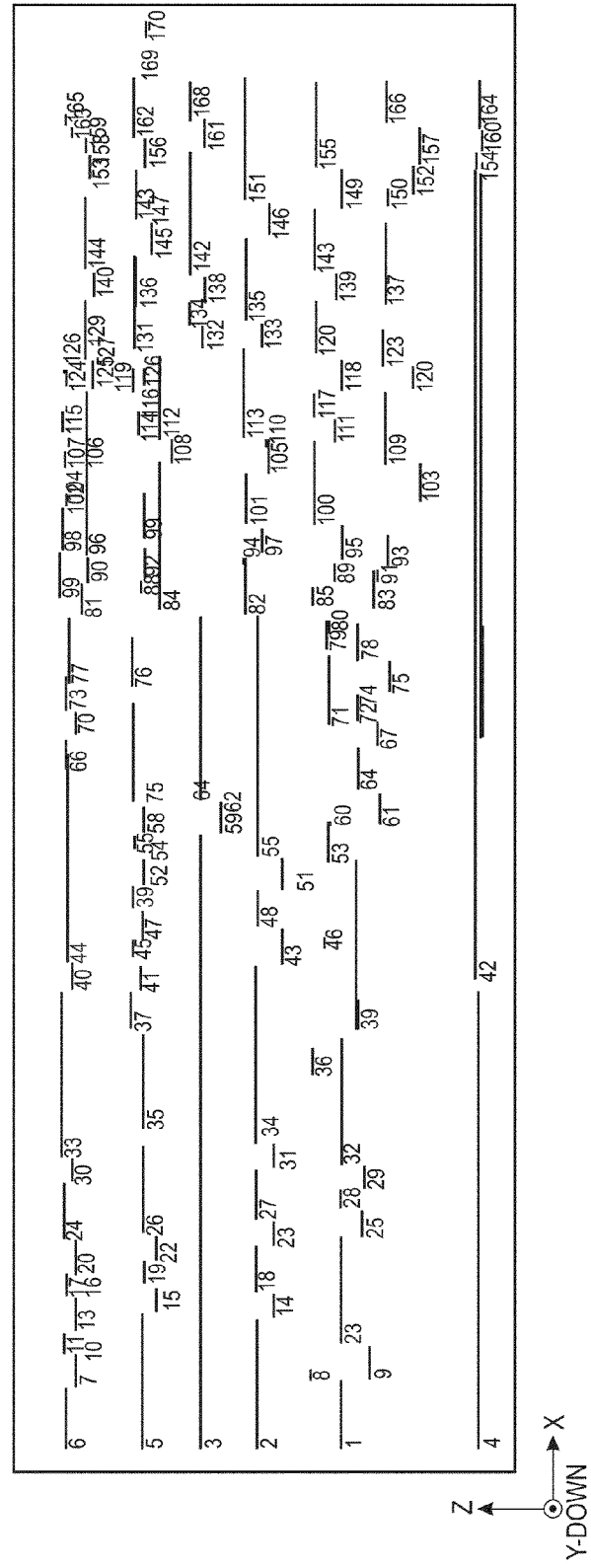
FIG. 14 is a plot of the further processed minimum distance LIDAR data shown in FIG. 13 after it is further processed by applying chain code analysis to generate the linear structures shown.

As indicated in FIG. 13, the promotional tags, for example, 260', 262' 264', 266', still cause breaks in the lines, and there is still noise present. A chain code analysis is now applied to generate linear structures as shown in FIG. 14, where the numerals are line identifiers. Chain code analysis is another image processing operation where the image is analyzed and the boundary of all black areas are traced. The result is a list of black objects defined by all the x,y coordinates of their borders (often stored in a highly compressed manner). This information can be used to easily generate center of gravity, bounding boxes, determine if an objects is a circle, rectangle, line, etc. According to the exemplary embodiment described, the boundary information is used to reduce the data from a bunch of pixels that represent lines into actual lines, i.e. a starting point and an ending point. Note that other image processing techniques such as: morphological filtering, median or other statistical filtering can also be applied here to remove the noise and joint small line segments into a larger line segment.

Figure 15:
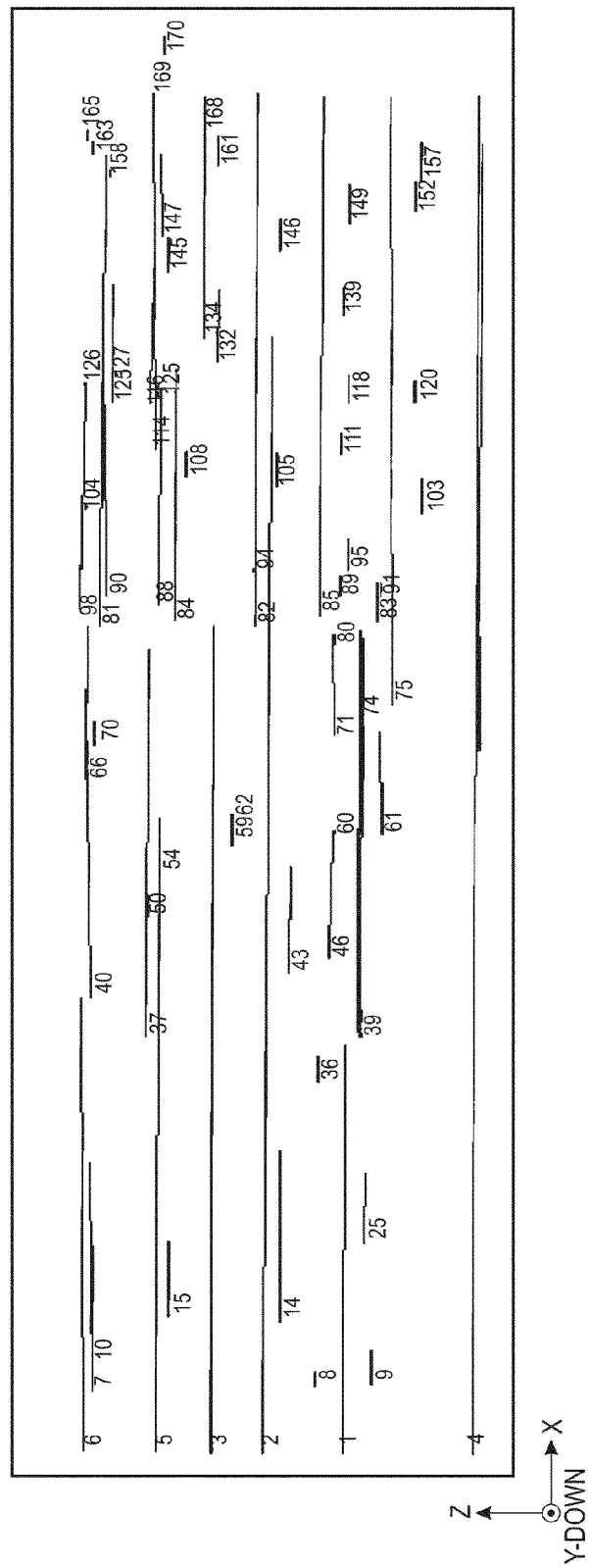
FIG. 15 is a plot of the processed minimum distance LIDAR data shown in FIG. 14 after it is further processed by applying line joining techniques to connect lines broken by promotional price tags (PPT) present in the LIDAR data.

FIG. 15 shows the resulting plot after line joining techniques are applied to connect lines that were broken by the promotionals. The purpose of line joining techniques is to look at lines in the same region and try to determine if they are really separate lines, or if they were originally one line that was broken up by noise, e.g. a promotional tag. In this case, if two lines are near each other and share the same vertical height from the floor, then they can be considered the same line and are joined, meaning a single line is defined that has the starting x position corresponding to the left-most line and the ending x position as the ending x position of the right-most line.

Figure 16:
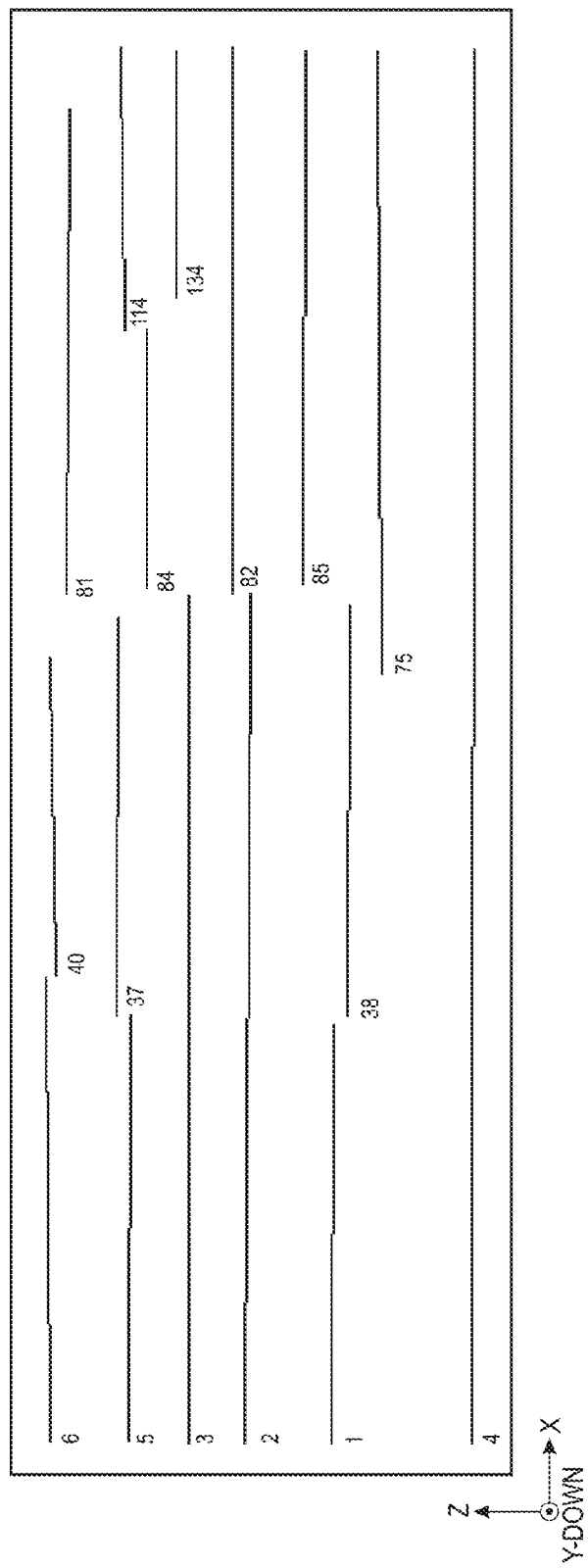
FIG. 16 is a plot of the processed minimum distance LIDAR data shown in FIG. 15 after it is further processed by applying a set of rules designed to remove lines associated with PPTs and other noise (e.g., short lines below and very close to a long line are removed)

Finally, as shown in FIG. 16, a set of rules is applied that are designed to remove the lines associated with promotionals and other noise (e.g., a short line below and very close to a long line should be removed).

Figure 17:
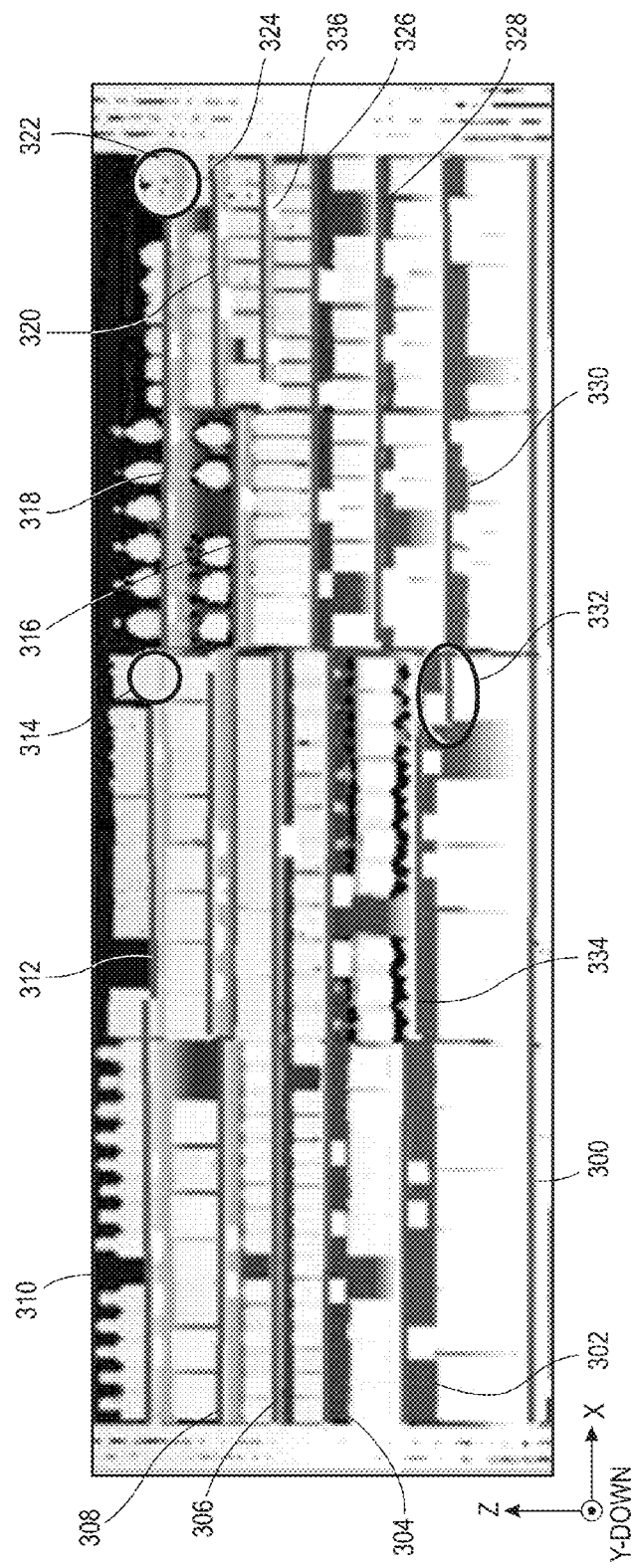
FIG. 17 is a pixel image illustrating shelf locations identified from the processed minimum distance LIDAR data shown in FIG. 16.

Notably, the process described above provides relatively accurate results, although there are a few errors that can be corrected by tuning of the algorithms. FIG. 17 shows the depth image with the shelves marked as said lines 300, 302, 304, 306, 308, 310, 312, 316, 318, 320, 324, 326, 328, 330, 334, 336; the error areas are marked with circles.

At this point shelf locations have been identified. It is worth noting that shelf identification is a useful feature for other missions of the retail robot previously described with reference to FIGS. 1-8. For example, when using high resolution cameras to locate and read promotional tags, sometimes promotional signage gets split as the fields of view of the cameras overlap. To overcome this, according to one exemplary embodiment, all images have to be vertically stitched from one column and the result scanned, which can increase the time necessary to run the associated mission. If the location of the shelves is known, then the system can predict where split tags could potentially occur, such as where a shelf edge is very low in one cameras field of view and only stitch images in those cases. As another example, if high resolution cameras are mounted on a tilt mechanism, the knowledge of shelf location can be used to tilt the cameras directly toward the shelf edge to get better barcode images with less focus problems.

B) Scan for Missing Products

The algorithm for finding missing products processes each shelf independently. The algorithm starts at the left side of the shelf, call it Column 0 ($C_O$), and looks at the LIDAR sample that corresponds to a few inches above the shelf. If the X value of that point is approximately the same as the shelf X value, then there is not a missing product and the column is incremented; if the X value is significantly greater than the shelf X it is considered a possible location for a missing product and the column is recorded, $C_S$. The algorithm then moves to the right (incrementing the column index) until it finds a product—calling that column $C_E$. If the number of columns exceeds a threshold, i.e., $C_E-C_A>$h_thr, then one more test is performed. The algorithm then moves the center column, $(C_E-C_A)/2$, and scan up and down to measure the vertical size of the possible hole. If the vertical size of the hole exceeds a threshold v_thr, then the detected size and location is recorded and marked as a missing product. According to the exemplary embodiment described herein, the thresholds are h_thr=9 and v_thr=10.

As discussed above, the system algorithm looks at the LIDAR sample that is a few inches above the shelf, the LIDAR sample including data which is an array of range values where the index of the array corresponds to the angle of the scan. According to one exemplary embodiment, the algorithm selects how many indices to look above the index that corresponds to the shelf location based on the shelf height; and if the shelf is very high, only 4 indices above the shelf index will be looked at, where, if the shelf is very low, 22 indices above the shelf index is looked at.

Figure 18:
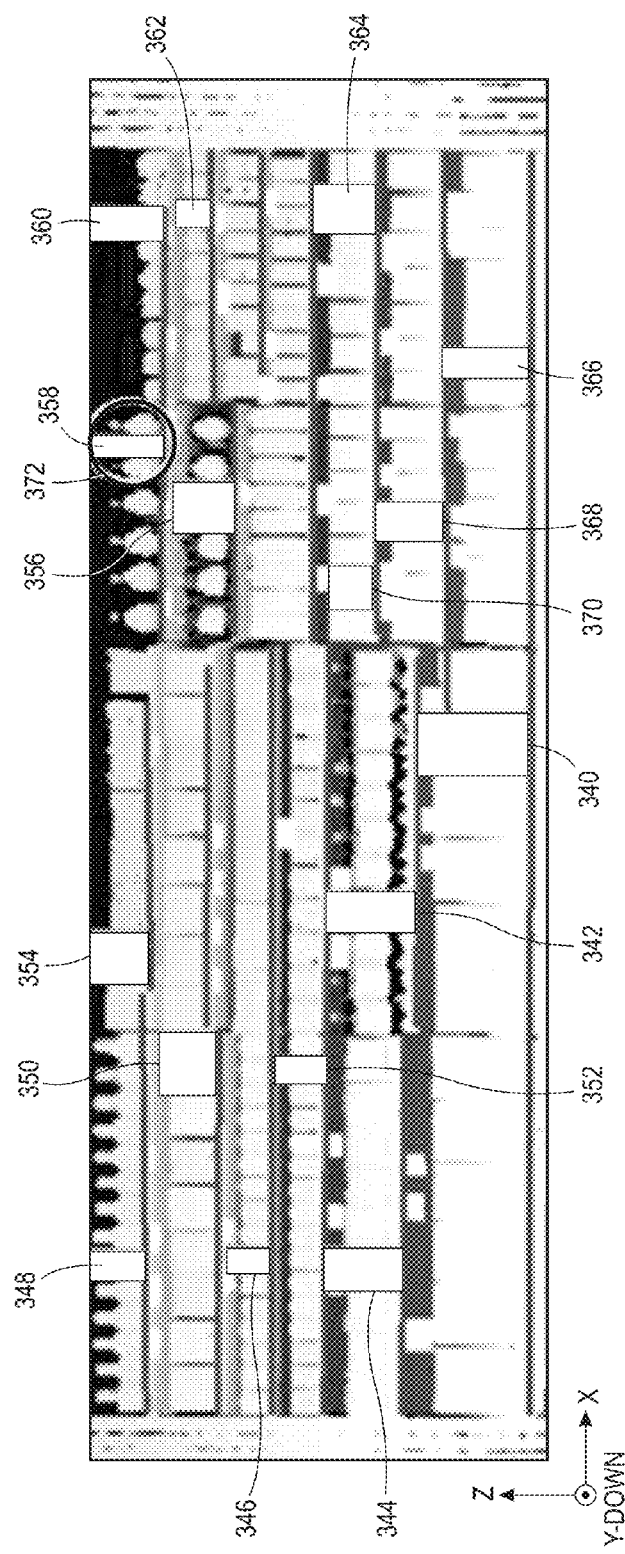
FIG. 18 is a pixel image showing the results of a missing product detection algorithm applied to LIDAR data according to an exemplary embodiment of this disclosure.

FIG. 18 shows the results of the missing product scan. Crosshatched rectangles 300, 342, 344, 346, 348, 350, 352, 354, 356, 358, 360, 362, 364, 366, 368, 370 represent the missing products. All the missing products were detected, but an additional slot marked with a circle was marked as a missing product where it was actually just a widely spaced product. Again, parameter tuning may be able to eliminate such errors. The knowledge of product sizes, based on store database or based on direct estimates of the depth image near the neighborhood of the detected rectangles, can also be used as a way to eliminate such errors.

It is worth noting that the missing product algorithm can not only find areas along the shelf where product is totally missing, but can also be used to detect areas where products are not fully faced, meaning the first one or two items have been taken, but there are still products available just sitting farther back on the shelf.

C) Detect Promotional Tags

Figure 19:
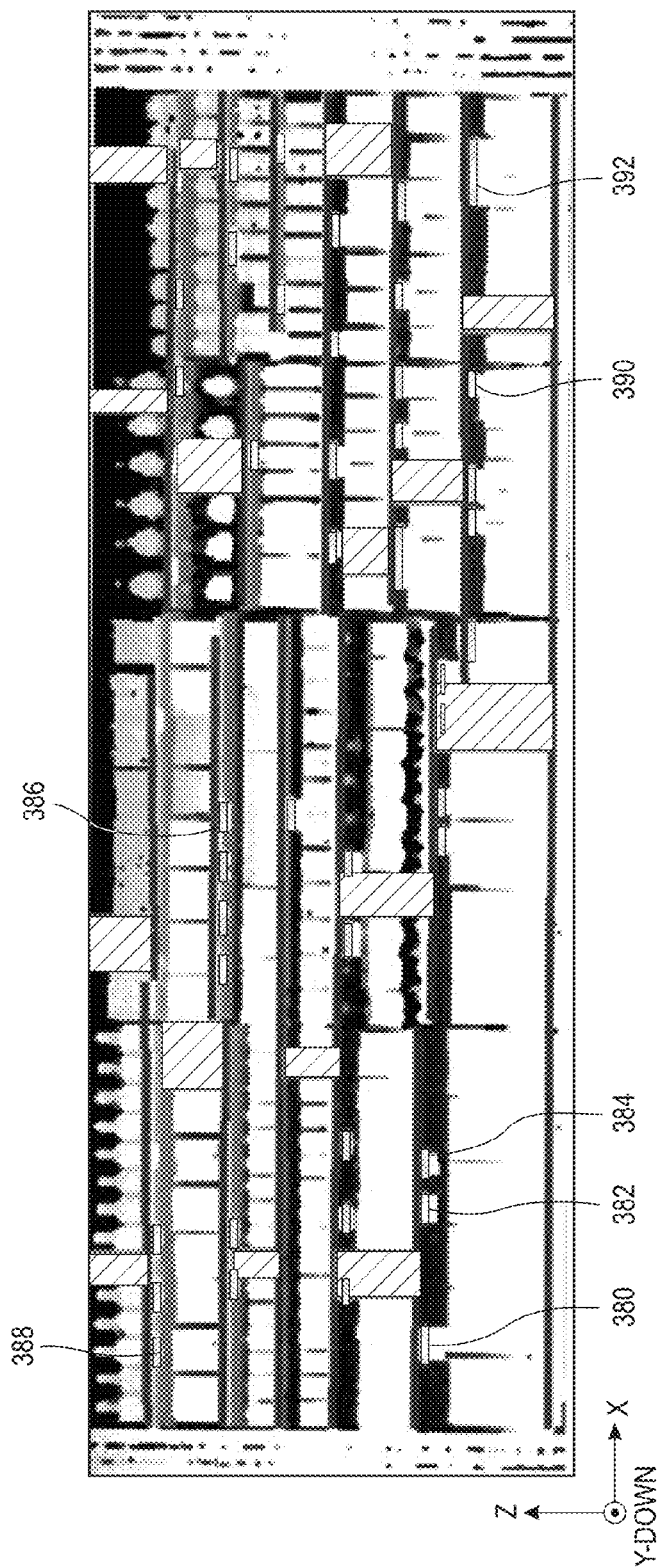
FIG. 19 is a pixel image showing the results of a PPT detection algorithm applied to LIDAR data according to an exemplary embodiment of this disclosure.
Figure 20:
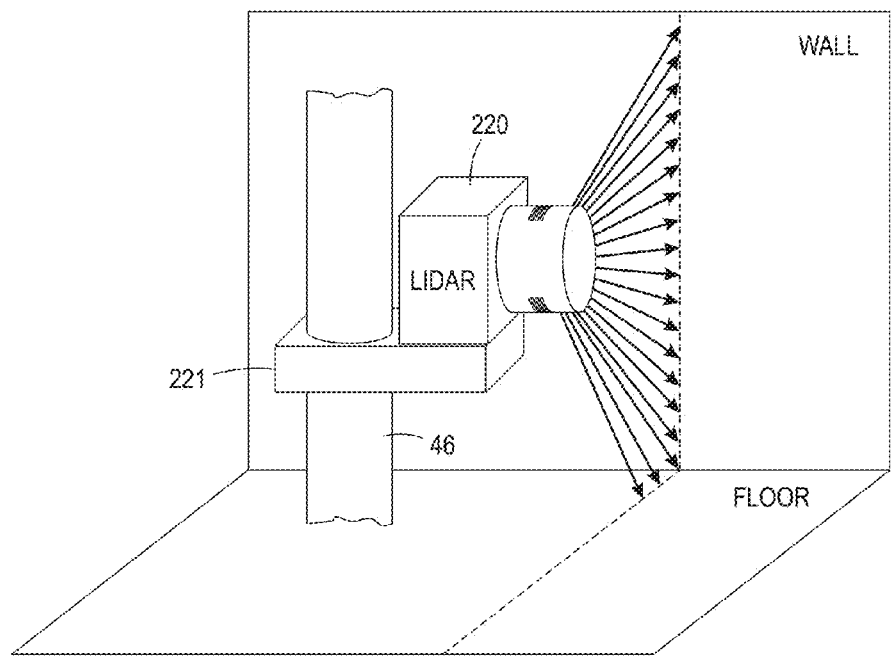
FIG. 20 is a diagram of a vertically oriented LIDAR according to an exemplary embodiment of this disclosure.

The final objective is to identify the location of promotional tags. Promotional tags are adhesive backed rectangular tags attached to the shelf edge that act as a notification of promotional pricing to a potential customer. The promotional tags are often out of date or simply in the wrong location, hence the desire to detect them. The LIDAR based system cannot read them, but the disclosed LIDAR system and method can determine their location which is useful when combined with knowledge from other retail robot missions. The promotional tag detection algorithm is similar to that of the missing products detection algorithm previously described. With reference to FIG. 18, it is clear promotional tags have a visible signature that can be identified; specifically, a very bright rectangular shape just below the shelf position. As with missing product detection, each shelf is scanned independently, where at each column of the shelf the algorithm examines the LIDAR data array starting at the index corresponding to the shelf and scans down until the measured depth is greater than ¼ inch past the shelf edge. If the number of array indices examined exceeds a threshold, e.g. 8, then the spot is marked as a potential promotional. FIG. 19 shows the results of the promotional tag detection algorithm indicating the detection of PPTs 380, 382, 384, 386, 388, 390, 392.

The technology disclosed here can be used on its own for specific retail missions, e.g. stock inventory, or can provide additional information to improve the performance of other missions, i.e. shelf locations and promotional tag locations associated with a robotic store profile generation system.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A retail environment robotic system comprising:
a mobile base including an operatively associated navigation component configured to determine a location of the mobile base within a retail environment, the retail environment including a plurality of product display units arranged in a plurality of aisles, each product display unit including a plurality of product display fixtures and a plurality of products arranged on one or more of the product display fixtures;
a vertical scanning LIDAR (Light Detection and Ranging) unit operatively mounted to the mobile base, the LIDAR unit configured to scan in a vertical direction and generate a vertical array of distance and angle values representative of a plurality of object distances and angles from the LIDAR unit to a plurality of objects detected along the vertical scan of the LIDAR unit;
a LIDAR data processing component operatively associated with the LIDAR unit, the LIDAR data processing component configured to process the plurality of vertical arrays of object distances and angles to generate a depth map associated with one or more product display units as the mobile base travels along an aisle, the depth map including a plurality of columns and a plurality of rows where each of the plurality of columns is associated with a single vertical scan of the LIDAR unit at one of a plurality of locations along the aisle, and each of the plurality of rows is associated with one of a plurality of vertical distances; and
a depth map processing component configured to identify regions of the depth map associated with regions of the one or more product display units which include one or more of a missing product, the product, a shelf, a product tag attached to the product, and a shelf tag attached to the shelf.

2. The retail environment robotic system according to claim 1, wherein the depth map processing component is configured to convert the depth map to a pixel image including a plurality of pixels, each pixel associated with a pixel location determined by a column position and row position of the corresponding LIDAR data and a pixel value determined by the object distance of the corresponding LIDAR data at the respective column positions and row positions of the corresponding LIDAR data.

3. The retail environment robotic system according to claim 2, wherein a polar to Cartesian conversion is used to convert the LIDAR data to the pixel image.

4. The retail environment robotic system according to claim 1, wherein the depth map processing component is configured to identify one or more shelf locations associated with the depth map by identifying a plurality of closest detected objects associated with the LIDAR data, the closest detected objects closest to one or both of the mobile base and LIDAR.

5. The retail environment robotic system according to claim 4, wherein the depth map processing component is configured to identify each shelf location by processing the LIDAR data using a sliding window to identify the closest detected objects within a plurality of localized regions.

6. The retail environment robotic system according to claim 4, wherein the depth map processing component is configured to generate a plot of the one or more identified shelf locations and process the plot to reduce noise by performing one or more of chain code processing, line joining processing and morphological processing.

7. The retail environment robotic system according to claim 1, wherein the depth map processing component is configured to initially identify one or more shelf locations associated with the depth map and subsequently identify regions of the depth map proximately above the identified shelf location associated with missing products.

8. The retail environment robotic system according to claim 1, wherein the depth map processing component is configured to initially identify one or more shelf locations associated with the depth map and subsequently identify regions of the depth map proximately below the identified shelf location associated with a shelf tag.

9. A retail environment robotic system comprising:
a mobile base including an operatively associated navigating component configured to determine a location of the mobile base within a retail environment including a plurality of product display units arranged in a plurality of aisles, each product display unit including a plurality of product display fixtures, a plurality of products arranged on one or more shelves of the product display fixtures, and a plurality of tags attached to the shelves of the product display fixtures, each tag including product-related data including a barcode associated with a respective product proximately located on the product display fixture shelf near the tag;
an image capture assembly operatively mounted on the mobile base, the assembly including a plurality of image capture devices for acquiring images of the product display units;
a vertical scanning LIDAR (Light Detection and Ranging) unit operatively mounted to one of the mobile base and the image capture assembly, the LIDAR unit configured to scan in a vertical direction and generate LIDAR data including a vertical array of distance and angle values representative of a plurality of object distances and angles from the LIDAR unit to a plurality of objects detected along the vertical scan of the LIDAR unit; and
a master control unit including an operatively associated memory which stores instruction and a processor for executing the instructions, the control unit instructions configured to process the images acquired by the plurality of image capture devices at a sequence of locations during a movement of the mobile base in the retail environment, thereby extracting the product-related data from the images of the product display units captured by the plurality of image capture devices during the movement of the mobile base, and generating a profile of the retail environment indicating locations of one or more of the products, missing products and the tags throughout the retail environment based on the extracted product-related data, the LIDAR data, and the locations of the mobile base at the sequence of locations provided by the navigation component.

10. The retail environment robotic system according to claim 9, wherein the product-related data includes at least one of printed barcodes and text.

11. The retail environment robotic system according to claim 9, wherein the master control unit generates one or more of a packaging order, a product stocking order and a set of replacement tags based on the generated profile of the retail environment.

12. The retail environment robotic system according to claim 9, wherein the image capture devices acquire images and the LIDAR unit scans in a continuous movement mode of the mobile base or a stop and go movement mode of the mobile base.

13. The retail environment robotic system according to claim 9, further comprising:
a LIDAR data processing component operatively associated with the LIDAR unit and master control unit, the LIDAR data processing component configured to process a plurality of vertical arrays of object distances and angles to generate a depth map associated with the one or more product display units as the mobile base travels along an aisle, the depth map including a plurality of columns and a plurality of rows where each of the plurality of columns is associated with a single scan of the LIDAR unit at one of a plurality of locations along the aisle, and each of the plurality of rows is associated with one of a plurality of vertical distances.

14. The retail environment robotic system according to claim 13, further comprising:
a depth map processing component configured to identify regions of the depth map associated with regions of the one or more product display units which include one or more of the missing products, the products, the shelves, and the tags.

15. The retail environment robotic system according to claim 14, wherein the depth map processing component is configured to identify one or more shelf locations associated with the depth map by identifying a plurality of closest detected objects associated with the LIDAR data, the closest detected objects closest to one or both of the mobile base and LIDAR.

16. The retail environment robotic system according to claim 15, wherein the depth map processing component is configured to identify each shelf location by processing the LIDAR data using a sliding window to identify the closest detected objects within a plurality of localized regions.

17. The retail environment robotic system according to claim 15, wherein the depth map processing component is configured to generate a plot of the one or more identified shelf locations and process the plot to reduce noise by performing one or more of chain code processing, line joining processing and morphological processing.

18. The retail environment robotic system according to claim 14, wherein the depth map processing component is configured to initially identify one or more shelf locations associated with the depth map and subsequently identify regions of the depth map proximately above the identified shelf location associated with missing products.

19. A retail environment robotic system comprising:
a mobile base including an operatively associated navigating component configured to determine a location of the mobile base within a retail environment including a plurality of product display units arranged in a plurality of aisles, each product display unit including a plurality of product display fixtures, a plurality of products arranged on one or more shelves of the product display fixtures, and a plurality of tags attached to the shelves of the product display fixtures, each tag including product-related data including a barcode associated with a respective product proximately located on the product display fixture shelf near the tag;
an image capture assembly operatively mounted on the mobile base, the assembly including a plurality of image capture devices for acquiring images of the product display units;
a vertical scanning LIDAR (Light Detection and Ranging) unit operatively mounted to one of the mobile base and the image capture assembly, the LIDAR unit configured to scan in a vertical direction and generate LIDAR data including a vertical array of distance and angle values representative of a plurality of object distances and angles from the LIDAR unit to a plurality of objects detected along the vertical scan of the LIDAR unit;
a master control unit including an operatively associated memory which stores instruction and a processor for executing the instructions, the control unit instructions configured to process the images acquired by the plurality of image capture devices at a sequence of locations during a movement of the mobile base in the retail environment, thereby extracting the product-related data from the images of the product display units captured by the plurality of image capture devices during the movement of the mobile base, and generating a profile of the retail environment indicating locations of one or more of the products, missing products and the tags throughout the retail environment based on the extracted product-related data, the LIDAR data, and the locations of the mobile base at the sequence of locations provided by the navigation component;
a LIDAR data processing component operatively associated with the LIDAR unit and master control unit, the LIDAR data processing component configured to process the plurality of vertical arrays of object distances and angles to generate a depth map associated with the one or more product display units as the mobile base travels along an aisle, the depth map including a plurality of columns and a plurality of rows where each of the plurality of columns is associated with a single scan of the LIDAR unit at one of a plurality of locations along the aisle, and each of the plurality of rows is associated with one of a plurality of vertical distances; and
a depth map processing component configured to identify regions of the depth map associated with regions of the one or more product display units which include one or more of the missing products, the products, the shelves, and the tags.

20. The retail environment robotic system according to claim 19,
wherein the depth map processing component is configured to identify one or more shelf locations associated with the depth map by identifying a plurality of closest detected objects associated with the LIDAR data, the closest detected objects closest to one or both of the mobile base and LIDAR;
wherein the depth map processing component is configured to identify each shelf location by processing the LIDAR data using a sliding window to identify the closest detected objects within a plurality of localized regions; and
wherein the depth map processing component is configured to generate a plot of the one or more identified shelf locations and process the plot to reduce noise by performing one or more of chain code processing, line joining processing and morphological processing.

21. The retail environment robotic system according to claim 20, wherein the depth map processing component is configured to initially identify one or more shelf locations associated with the depth map and subsequently identify regions of the depth map proximately above the identified shelf location associated with missing products.

* * * * *